United States Patent
Luo et al.

(10) Patent No.: US 11,996,557 B2
(45) Date of Patent: May 28, 2024

(54) DIRECT REGENERATION OF LITHIUM ION CATHODES BY IONOTHERMAL RELITHIATION

(71) Applicant: UT-Battelle, LLC, Oak Ridge, TN (US)

(72) Inventors: Huimin Luo, Knoxville, TN (US); Sheng Dai, Knoxville, TN (US); Tao Wang, Knoxville, TN (US); Ilias Belharouak, Knoxville, TN (US); Jianlin Li, Knoxville, TN (US); Yaocai Bai, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 17/736,426

(22) Filed: May 4, 2022

(65) Prior Publication Data

US 2022/0376240 A1   Nov. 24, 2022

Related U.S. Application Data

(60) Provisional application No. 63/184,270, filed on May 5, 2021.

(51) Int. Cl.
*H01M 4/525* (2010.01)
*C01G 53/00* (2006.01)
(Continued)

(52) U.S. Cl.
CPC ............ *H01M 4/525* (2013.01); *C01G 53/50* (2013.01); *H01M 4/04* (2013.01); *H01M 4/505* (2013.01);
(Continued)

(58) Field of Classification Search
CPC ........ H01M 4/525; H01M 4/04; H01M 4/505; H01M 2004/028; C01G 53/50;
(Continued)

(56) References Cited

U.S. PATENT DOCUMENTS

2019/0260100 A1*  8/2019  Sloop .................. H01M 4/48
2019/0273290 A1*  9/2019  Sloop ............... H01M 10/0525
(Continued)

OTHER PUBLICATIONS

Belharouak, I., et al., "Li(Ni1/3Co1/3Mn1/3)O2 as a suitable cathode for high power applications", Journal of Power Sources (2003), Received Mar. 17, 2003; accepted Mar. 31, 2003, pp. 247-252, 123.
(Continued)

*Primary Examiner* — Andrew J. Oyer
(74) *Attorney, Agent, or Firm* — Scully, Scott, Murphy & Presser, P.C.

(57) ABSTRACT

A method for relithiating cathode material from spent lithium-based batteries, the method comprising: (i) mixing delithiated cathode material and a lithium salt with an ionic liquid in which the lithium salt is at least partially soluble to form an initial mixture; (ii) heating the initial mixture to a temperature of 100° C. to 300° C. to result in relithiation of the delithiated cathode material; and (iii) separating the ionic liquid from the relithiated cathode material; wherein, in embodiments, the cathode material is a lithium metal oxide, wherein the metal is selected from the group consisting of Ni, Co, Fe, Mn, Al, Zr, Ti, Nb, and combinations thereof, or wherein the cathode material has the formula $LiNi_xMn_yCo_zO_2$, wherein x>0, y>0, z>0, and x+y+z=1; wherein, in some embodiments, the ionic liquid has a nitrogen-containing cationic portion, such as an imidazolium ionic liquid.

20 Claims, 8 Drawing Sheets

(51) Int. Cl.
*H01M 4/02* (2006.01)
*H01M 4/04* (2006.01)
*H01M 4/505* (2010.01)

(52) U.S. Cl.
CPC ...... *C01P 2002/50* (2013.01); *C01P 2002/72* (2013.01); *C01P 2002/82* (2013.01); *C01P 2002/88* (2013.01); *C01P 2006/40* (2013.01); *H01M 2004/028* (2013.01)

(58) Field of Classification Search
CPC ............... C01G 53/006; C01P 2002/50; C01P 2002/72; C01P 2002/82; C01P 2002/88; C01P 2006/40; C01P 2004/51; C01P 2004/61; Y02W 30/84
See application file for complete search history.

(56) References Cited

U.S. PATENT DOCUMENTS

| | | | | |
|---|---|---|---|---|
| 2020/0280095 | A1* | 9/2020 | Chiefari | H01M 10/0569 |
| 2021/0320293 | A1* | 10/2021 | Lipson | H01M 4/131 |
| 2022/0271356 | A1* | 8/2022 | Sloop | H01M 4/505 |

OTHER PUBLICATIONS

Belharouak, I., et al., "Safety characteristics of Li(Ni0.8Co0.15Al0.05)O2 and Li(Ni1/3Co1/3Mn1/3)O2", Electrochemistry Communications (2006), Received Nov. 3, 2005; received in revised form Dec. 5, 2005; accepted Dec. 9, 2005, Available online Jan. 18, 2006. pp. 329-335, 8.

Chen, M., et al., "Recycling End-of-Life Electric Vehicle Lithium-Ion Batteries", Joule, Nov. 20, 2019, pp. 2622-2646, 3.

Ma, Z., et al., "Preparation of Inorganic Materials Using Ionic Liquids", Adv. Mater. 2010, Received: Feb. 20, 2009 Published online: Sep. 8, 2009, pp. 261-285, 22.

Recham, N., et al., "Ionothermal Synthesis of Tailor-Made LiFePO4 Powders for Li-Ion Battery Applications", Chem. Mater. 2009, pp. 1096-1107, vol. 21, No. 6.

Shi, Y., et al., "Ambient-Pressure Relithiation of Degraded LixNi0.5Co0.2Mn0.3O2 ($0 < x < 1$) via Eutectic Solutions for Direct Regeneration of Lithium-Ion Battery Cathodes", Adv. Energy Mater. 2019, Received: Feb. 6, 2019 Revised: Mar. 17, 2019, Published online: Apr. 8, 2019, pp. 1900454 1-9, 9.

Wang, T., et al., "Direct Recycling of Spent NCM Cathodes through Ionothermal Lithiation", Adv. Energy Mater. 2020, Received: Apr. 6, 2020, Revised: Jun. 8, 2020, Published online: Jun. 24, 2020 pp. 2001204 1-6, 10.

* cited by examiner

US 11,996,557 B2

DIRECT REGENERATION OF LITHIUM ION CATHODES BY IONOTHERMAL RELITHIATION

CROSS REFERENCE TO RELATED APPLICATION

The present application claims benefit of U.S. Provisional Application No. 63/184,270, filed on May 5, 2021, all of the contents of which are incorporated herein by reference.

GOVERNMENT SUPPORT

This invention was made with government support under Prime Contract No. DE-AC05-00OR22725 awarded by the U.S. Department of Energy. The government has certain rights in the invention.

FIELD OF THE INVENTION

The present invention generally relates to methods for recycling cathode material from lithium-based batteries, and more particularly, to methods in which the delithiated cathode material is relithiated.

BACKGROUND OF THE INVENTION

Lithium-ion batteries (LIBs) with high energy density make a significant contribution to solving energy storage issues but are at the same time environmentally unfriendly due to their hazardous materials, such as carcinogenic heavy metals and toxic electrolytes. With the rapidly increasing use of LIBs in our highly electrified society, proper handling of end-of-life (EOL) LIBs has become an urgent task. Efforts are ongoing to recycle highly valuable cathode materials, such as lithium metal oxides (M. Chen et al., *Joule*, 3, 2622, 2019). Current recycling technologies for cathode materials include pyrometallurgy based on a high-temperature smelting process, hydrometallurgy using aqueous chemistry, and direct recycling or upcycling active materials retaining their original compound structure. Although pyrometallurgy and hydrometallurgy can return valuable metals, such as Li, Co, and Ni, into the LIB production chain, the complete destruction of cathode particles reduces the highly added value of the compound structure. In contrast, the goal of direct recycling technology is to non-destructively mend the compositional and structural defects of degraded Li-deficient cathode particles in EOL LIBs.

As for the most popular cathode materials, NCM (LiNi$_x$Co$_y$Mn$_z$O$_2$, 0<x,y,z<1, x+y+z=1), the irreversible structural change resulting from Li loss is the main process occurring in cathode capacity degradation (I. Belharouak et al., *J. Power Sources*, 123, 247, 2003). Although a relithiation process can directly upcycle spent NCM particles to achieve pristine structure and stoichiometry, the conventional processes generally require harsh conditions, such as high temperature and/or high pressure. Thus, there would be a significant benefit in a relithiation method for the direct recycling of lithium battery cathodes that employs relatively mild conditions and is scalable, cost-effective, and environmentally friendly.

SUMMARY OF THE INVENTION

The present disclosure is foremost directed to a relatively mild, straight-forward, and environmentally friendly method for relithiating cathode material from spent (end-of-life) lithium-based batteries. The method includes at least the following steps: (i) mixing delithiated cathode material and a lithium salt with an ionic liquid in which the lithium salt is at least partially soluble to form an initial mixture; (ii) heating the initial mixture to a temperature of 100° C. to 300° C. to result in relithiation of the delithiated cathode material; and (iii) separating the ionic liquid from the relithiated cathode material. The ionic liquid may be separated from the relithiated cathode material in step (iii) by any suitable means, such as filtering or centrifugation. Moreover, after the separation, the ionic liquid may advantageously be re-used in the method. The facile re-use of the ionic liquid permits robust recycling of the ionic liquid, thereby making the method further environmentally friendly. Moreover, the very low volatility of the ionic liquid makes the method significantly less hazardous and less toxic compared to methods relying on organic solvents.

BRIEF DESCRIPTION OF THE DRAWINGS

FIG. 1A is a synthetic scheme for producing [C$_2$mim][NTf$_2$], [C$_4$mim][NTf$_2$], and [C$_2$OHmim][NTf$_2$] ionic liquids. FIG. 1B is a schematic showing an exemplary ionothermal process for converting delithiated NCM cathode material (D-NCM) to relithiated NCM cathode material (R-NCM).

FIG. 2A shows X-ray diffraction (XRD) patterns for P-NCM (pristine NCM), D-NCM (delithiated NCM), and R-NCM-LiBr—C$_2$ (relithiated) material over 10-70 2θ degrees. FIG. 2B shows the XRD patterns over 64-66 2θ degrees. FIG. 2C is a bar graph showing lithium molar ratios of P-NCM, D-NCM, and R-NCM-LiBr—C$_2$ material based on ICP results. FIG. 2D is a graph showing thermogravimetric (TGA) curves of P-NCM, D-NCM, and R-NCM-LiBr—C$_2$.

FIG. 3A is a graph showing first cycle charge/discharge curves of P-NCM, D-NCM, and R-NCM-LiBr—C$_2$ for half-cell tests. FIG. 3B is a graph showing second cycle charge/discharge curves of P-NCM, D-NCM, and R-NCM-LiBr—C$_2$ for half-cell tests.

FIG. 3C is a graph showing first cycle charge/discharge curves of P-NCM, D-NCM, and R-NCM-LiBr—C$_2$ for full-cell tests. FIG. 3D is a graph showing second cycle charge/discharge curves of P-NCM, D-NCM, and R-NCM-LiBr—C$_2$ for full-cell tests. FIG. 3E is a graph showing cycle performance of P-NCM, D-NCM, and R-NCM-LiBr—C$_2$ for full-cell tests. The cathode active material density was as high as 10 mg cm$^{-2}$.

FIG. 4A is a graph plotting Li molar ratio of R-NCMs under different relithiation conditions calculated from ICP-OES results. FIG. 4B is a graph plotting weight percentage (%) of R-NCMs under different relithiation conditions calculated from TGA results.

DETAILED DESCRIPTION OF THE INVENTION

Figures 1A, 1B:
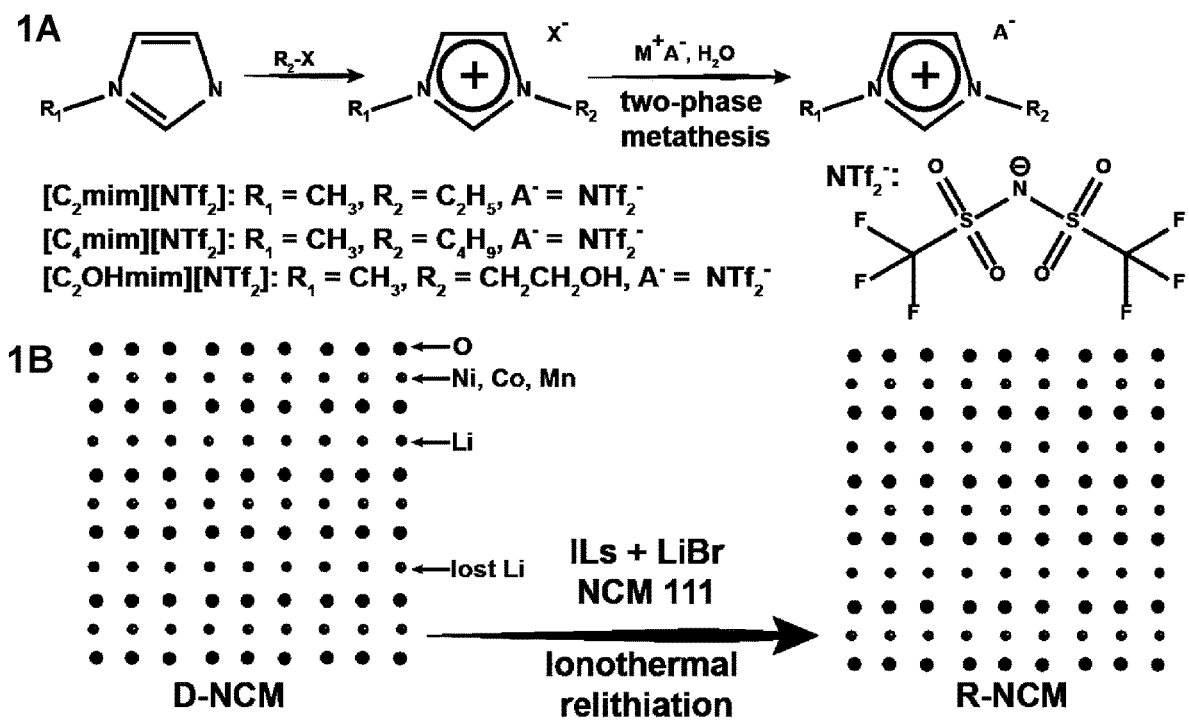
FIGS. 1A-1B.

As used herein, the term "hydrocarbon group" (also denoted by the group R) is defined as a chemical group composed solely of carbon and hydrogen, except that the hydrocarbon group may or may not be (i.e., is optionally) substituted with one or more fluorine atoms to result in partial or complete fluorination of the hydrocarbon group. In different embodiments, one or more of the hydrocarbon groups can contain, for example, 1, 2, 3, 4, 5, 6, 7, 8, 9, 10, 11, 12, 13, 14, 15, 16, 17, 18, 19, or 20 carbon atoms, or a number of carbon atoms within a particular range bounded by any two of the foregoing carbon numbers. Hydrocarbon groups in different compounds described herein, or in different positions of a compound, may possess the same or different number (or preferred range thereof) of carbon atoms in order to independently adjust its physical properties and solubilizing ability.

In a first set of embodiments, the hydrocarbon group (R) is a saturated and straight-chained group, i.e., a straight-chained (linear) alkyl group. Some examples of straight-chained alkyl groups include methyl, ethyl, n-propyl, n-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, and n-eicosyl groups.

In a second set of embodiments, the hydrocarbon group (R) is saturated and branched, i.e., a branched alkyl group. Some examples of branched alkyl groups include isopropyl (2-propyl), isobutyl (2-methylprop-1-yl), sec-butyl (2-butyl), t-butyl (1,1-dimethylethyl-1-yl), 2-pentyl, 3-pentyl, 2-methylbut-1-yl, isopentyl (3-methylbut-1-yl), 1,2-dimethylprop-1-yl, 1,1-dimethylprop-1-yl, neopentyl (2,2-dimethylprop-1-yl), 2-hexyl, 3-hexyl, 2-methylpent-1-yl, 3-methylpent-1-yl, isohexyl (4-methylpent-1-yl), 1,1-dimethylbut-1-yl, 1,2-dimethylbut-1-yl, 2,2-dimethylbut-1-yl, 2,3-dimethylbut-1-yl, 3,3-dimethylbut-1-yl, 1,1,2-trimethylprop-1-yl, and 1,2,2-trimethylprop-1-yl groups, isoheptyl, isooctyl, and the numerous other branched alkyl groups having up to 20 carbon atoms, wherein the "1-yl" suffix represents the point of attachment of the group.

In a third set of embodiments, the hydrocarbon group (R) is saturated and cyclic, i.e., a cycloalkyl group. Some examples of cycloalkyl groups include cyclopropyl, cyclobutyl, cyclopentyl, cyclohexyl, cycloheptyl, and cyclooctyl groups. The cycloalkyl group can also be a polycyclic (e.g., bicyclic) group by either possessing a bond between two ring groups (e.g., dicyclohexyl) or a shared (i.e., fused) side (e.g., decalin and norbornane).

In a fourth set of embodiments, the hydrocarbon group (R) is unsaturated and straight-chained, i.e., a straight-chained (linear) olefinic or alkenyl group. The unsaturation occurs by the presence of one or more carbon-carbon double bonds and/or one or more carbon-carbon triple bonds. Some examples of straight-chained olefinic groups include vinyl, propen-1-yl (allyl), 3-buten-1-yl ($CH_2=CH-CH_2-CH_2-$), 2-buten-1-yl ($CH_2-CH=CH-CH_2-$), butadienyl, 4-penten-1-yl, 3-penten-1-yl, 2-penten-1-yl, 2,4-pentadien-1-yl, 5-hexen-1-yl, 4-hexen-1-yl, 3-hexen-1-yl, 3,5-hexadien-1-yl, 1,3,5-hexatrien-1-yl, 6-hepten-1-yl, ethynyl, propargyl (2-propynyl), 3-butynyl, and the numerous other straight-chained alkenyl or alkynyl groups having up to 20 carbon atoms.

In a fifth set of embodiments, the hydrocarbon group (R) is unsaturated and branched, i.e., a branched olefinic or alkenyl group. Some examples of branched olefinic groups include propen-2-yl ($CH_2=C.-CH_3$), 1-buten-2-yl ($CH_2=C.-CH_2-CH_3$), 1-buten-3-yl ($CH_2=CH-CH.-CH_3$), 1-propen-2-methyl-3-yl ($CH_2=C(CH_3)-CH_2-$), 1-penten-4-yl, 1-penten-3-yl, 1-penten-2-yl, 2-penten-2-yl, 2-penten-3-yl, 2-penten-4-yl, and 1,4-pentadien-3-yl, and the numerous other branched alkenyl groups having up to 20 carbon atoms, wherein the dot in any of the foregoing groups indicates a point of attachment.

In a sixth set of embodiments, the hydrocarbon group (R) is unsaturated and cyclic, i.e., a cycloalkenyl group. The unsaturated cyclic group can be aromatic or aliphatic. Some examples of unsaturated cyclic hydrocarbon groups include cyclopropenyl, cyclobutenyl, cyclopentenyl, cyclopentadienyl, cyclohexenyl, cyclohexadienyl, phenyl, benzyl, cycloheptenyl, cycloheptadienyl, cyclooctenyl, cyclooctadienyl, and cyclooctatetraenyl groups. The unsaturated cyclic hydrocarbon group may or may not also be a polycyclic group (such as a bicyclic or tricyclic polyaromatic group) by either possessing a bond between two of the ring groups (e.g., biphenyl) or a shared (i.e., fused) side, as in naphthalene, anthracene, phenanthrene, phenalene, or indene fused ring systems.

In some embodiments, any of the generic substituents described below may independently exclude any one or more of the classes, subclasses, or particular hydrocarbon groups described above, or may independently include only specific hydrocarbon groups selected from the hydrocarbon groups (R) described above.

One or more of the hydrocarbon groups described above may also include one or more heteroatoms (i.e., non-carbon and non-hydrogen atoms), such as one or more elements selected from oxygen, nitrogen, sulfur, silicon, phosphorus, boron, and halide atoms, as well as groups containing one or more of these heteroatoms (i.e., heteroatom-containing groups). Some examples of oxygen-containing groups include hydroxy (OH), alkoxy (OR), carbonyl-containing (e.g., carboxylic acid, ketone, aldehyde, carboxylic ester, amide, and urea functionalities), nitro ($NO_2$), carbon-oxygen-carbon (ether), sulfonyl, and sulfinyl (i.e., sulfoxide) groups. Some particular examples of alkoxy groups —OR include methoxy, ethoxy, n-propoxy, isopropoxy, n-butoxy, isobutoxy, t-butoxy, phenoxy, benzyloxy, 2-hydroxyethoxy, 2-methoxyethoxy, 2-ethoxyethoxy, vinyloxy, and allyloxy groups. In the case of an ether group, the ether group can also be a polyalkyleneoxide (polyalkyleneglycol) group, such as a polyethyleneoxide group. Some examples of nitrogen-containing groups include primary amine, secondary amine, tertiary amine (i.e., $-NR_2$ or $NR_3^+$, wherein R is independently selected from H and hydrocarbon groups set forth above), nitrile, amide (i.e., $-C(O)NR_2$ or $-NRC(O)$ R, wherein R is independently selected from hydrogen atom and hydrocarbon groups set forth above), imine (e.g., $-CR=NR$, wherein R is independently H or a hydrocarbon group), oxime ($-CR=N-OH$), amidoxime ($-C(NH_2)=N-OH$), nitro, urea ($-NR-C(O)-NR_2$, wherein R is independently H or a hydrocarbon group), and carbamate groups ($-NR-C(O)-OR$, wherein R is independently H or a hydrocarbon group). Some examples of phosphorus-containing groups include $-PR_2$, $-PR_3^+$, $-P(=O)R_2$, $-P(OR)_2$, $-O-P(OR)_2$, $-R-P(OR)_2$, $-P(=O)(OR)_2$, $-O-P(=O)(OR)_2$, $-O-P(=O)(OR)(R)$, $-O-P(=O)R_2$, $-R-P(=O)(OR)_2$, $-R-P(=O)(OR)(R)$, and $-R-P(=O)R_2$ groups, wherein R is independently selected from hydrogen atom and hydrocarbon groups set forth above. Some examples of sulfur-containing groups include mercapto (i.e., —SH), thioether (i.e., sulfide, e.g., —SR), disulfide ($-R-S-S-R$), sulfoxide ($-S(O)R$), sulfone ($-SO_2R$), sulfonate ($-S(=O)_2OR$, wherein R is H, a hydrocarbon group, or a cationic group), and sulfate groups ($-OS(=O)_2OR$, wherein R is H, a hydrocarbon group, or a cationic group). Some examples of halide atoms include fluorine, chlorine, bromine, and iodine. Any one or more of the above heteroatom-containing groups may substitute one or more hydrogen atoms on the hydrocarbon group (R). In some embodiments, one or more of the heteroatoms described above (e.g., oxygen, nitrogen, and/or sulfur atoms) is/are inserted between carbon atoms (e.g., as —O—, —NR—, or —S—) in any of the hydrocarbon groups described above to form a heteroatom-substituted hydrocarbon group.

The present disclosure is foremost directed to a facile method for relithiating lithium-depleted (i.e., delithiated) cathode material obtained from spent lithium-based batteries. The term "spent," as used herein, refers to lithium-based batteries in which the cathode has been partially or completely depleted of lithium (i.e., delithiated) and generally undergoes an irreversible structural change due to the lithium loss.

The delithiated cathode (positive electrode) material can be obtained from any type of lithium-based battery in which the cathode is spent (delithiated). In some embodiments, the lithium-based battery is a lithium metal (plate) battery in which the anode contains a film of lithium metal. The lithium metal battery may contain any of the components typically found in a lithium metal battery, such as described in, for example, X. Zhang et al., *Chem. Soc. Rev.*, 49, 3040-3071, 2020; P. Shi et al., *Adv. Mater. Technol.*, 5(1), 1900806 (1-15), January 2020; and X.-B. Cheng et al., *Chem. Rev.*, 117, 15, 10403-10473 (2017), the contents of which are incorporated herein by reference. In some embodiments, the lithium metal battery contains molybdenum disulfide in the cathode. The lithium metal battery may be a single-use (primary) or rechargeable (secondary) battery. In other embodiments, the lithium-based battery is a lithium-ion battery in which the anode contains lithium ions stored in a base material (e.g., lithium ions intercalated in graphite). The lithium-ion battery may contain any of the components typically found in a lithium-ion battery, including positive (cathode) and negative (anode) electrodes, current collecting plates, a battery shell, such as described in, for example, U.S. Pat. Nos. 8,252,438, 7,205,073, and 7,425,388, the contents of which are incorporated herein by reference in their entirety. In some embodiments, the lithium-ion battery is more specifically a lithium-sulfur battery, as well known in the art, e.g., L. Wang et al., *Energy Environ. Sci.*, 8, 1551-1558, 2015, the contents of which are herein incorporated by reference. The lithium-ion battery may be a single-use (primary) or rechargeable (secondary) battery. In some embodiments, any one or more of the above specific components may be excluded from the battery.

The cathode electrode material being relithiated can have any of the compositions well known in the art, except that the composition is at least partially depleted in lithium. The cathode typically has an oxide composition containing at least one of Ni, Co, Fe, Mn, Al, Zr, Ti, Nb, or combination of any two or more of these elements, aside from Li, if present. In some embodiments, the cathode includes or exclusively contains a $LiFePO_4$ composition. In other embodiments, the cathode includes or exclusively contains a lithium metal oxide (or sulfide) composition, wherein the metal may be selected from, for example, Ni, Co, Fe, Mn, Al, Zr, Ti, Nb, or combination thereof, or more typically a transition metal, such as Co, Fe, Ni, or Mn, or combination thereof. In particular embodiments, the metal is at least Ni, Co, or combination thereof. In some embodiments, the cathode composition may be or include, for example, manganese dioxide ($MnO_2$), iron disulfide ($FeS_2$), copper oxide (CuO), or $LiTiO_3$ (LTO). To improve conductivity at the cathode, conductive carbon material (e.g., carbon black, carbon fiber, or graphite) may be in admixture with the cathode electrode material.

In some embodiments, the cathode material being relithiated has a lithium metal oxide composition, such as a cathodic composition containing at least lithium, nickel, and oxide, or a cathodic composition containing at least lithium, cobalt, and oxide. In some embodiments, the cathode material has a lithium metal oxide composition containing at least lithium, nickel, manganese, and oxide. In other embodiments, the cathode material has a lithium metal oxide composition containing at least lithium, nickel, cobalt, and oxide. Some examples of cathode materials being relithiated include $LiCoO_2$, $LiMn_2O_4$, $LiNiCoO_2$, $LiMnO_2$, $LiNiCoAlO_2$, and $LiNi_xMn_{2-x}O_4$ compositions, or more specifically, $LiNi_{0.5}Mn_{1.5}O_4$, which is particularly suitable as a 5.0 V cathode material, wherein x is a number greater than 0 and less than 2. In some embodiments, one or more additional elements may substitute a portion of the Ni or Mn. In some embodiments, one or more additional elements may substitute a portion of the Ni or Mn, as in $LiNi_xCo_{1-x}PO_4$, and $LiCu_xMn_{2-x}O_4$, materials (Cresce, A. V., et al., *Journal of the Electrochemical Society*, 2011, 158, A337-A342).

In further specific embodiments, the cathode material being relithiated has a composition containing at least lithium, nickel, manganese, cobalt, and oxide. Such compositions are typically referred to as NMC compositions. The composition typically has the formula $LiNi_xMn_yCo_zO_2$, wherein $x+y+z=1$, and each of x, y, $z>0$. In some embodiments, x, y, and z are each in a range of 0.2-0.5, or x may be precisely or at least 0.5, 0.55, 0.6, 0.65, 0.7, 0.75, or 0.8 or within a range bounded by any two of these values. Some examples of NMC compositions include $LiNi_{1/3}Mn_{1/3}Co_{1/3}O_2$ (i.e., $LiNiMnCoO_2$ or NMC111), $LiNi_{0.5}Mn_{0.3}Co_{0.2}O_2$ (NMC532), $LiNi_{0.8}Mn_{0.1}Co_{0.1}O_2$ (NMC811), and $LiNi_{0.6}Mn_{0.2}Co_{0.2}O_2$ (NMC622). The cathode may alternatively have a layered-spinel integrated $Li[Ni_{1/3}Mn_{2/3}]O_2$ composition, as described in, for example, Nayak et al., *Chem. Mater.*, 2015, 27 (7), pp. 2600-2611.

In other embodiments, the cathode may have or include a composition containing at least lithium, nickel, cobalt, aluminum, and oxide. Such compositions are typically referred to as NCA compositions. NCA compositions typically have the formula $LiNi_xCo_yAl_zO_2$, wherein $x+y+z=1$, and each of x, y, $z>0$. In some embodiments, x is precisely or about 0.6, 0.7, 0.8, or 0.9, such as in the composition $LiNi_{0.84}Co_{0.12}Al_{0.04}O_2$. In some embodiments, an NCA composition is mixed with an NMC composition.

In the method, any one of the delithiated cathode materials described above is mixed with a lithium salt and an ionic liquid in which the lithium salt is at least partially soluble to form an initial mixture. The foregoing step may be referred to as step (i). The delithiated cathode material is insoluble in the ionic liquid. The delithiated cathode material is typically in the form of a powder when mixed with the lithium salt and ionic liquid in step (i). In some embodiments, before step (i), the delithiated cathode material is ground into a powder form. Methods for grinding metals and metal oxide materials into a fine powder form are well known in the art. The powder of delithiated cathode material typically has a maximum average particle size of 100, 200, or 500 microns. In some embodiments, the delithiated cathode material has an average or substantially uniform particle size of, for example, 1, 2, 5, 10, 20, 50, 100, 200, or 500 microns, or a particle size within a range bounded by any two of the foregoing values (e.g., 1-500 microns, 1-200 microns, 50-500 microns, or 50-200 microns). In some embodiments, any of the foregoing average particle sizes may instead be a maximum particle size (e.g., a particle size of up to 100, 200, or 500 microns).

The lithium salt in step (i) can be any lithium salt known in the art. In particular embodiments, the lithium salt is or includes a lithium halide, such as lithium chloride, lithium bromide, or lithium iodide. In other embodiments, the lithium salt is a lithium carboxylate, such as lithium oxalate, lithium formate, lithium acetate, lithium propionate, lithium malonate, or lithium succinate, or a lithium fluorocarboxylate (e.g., lithium trifluoroacetate or pentafluoropropionate). In several other embodiments, the lithium salt may be, for example, a lithium salt of: fluorosulfonimide ($(FSO_2)_2N^-$), hexafluorophosphate ($PF_6^-$), hexachlorophosphate ($PCl_6^-$), perchlorate, chlorate, chlorite, perbromate, bromate, bromite, iodate, aluminum fluoride (e.g., $AlF_4^-$), aluminum chloride (e.g., $Al_2Cl_7^-$ and $AlCl_4^-$), aluminum bromide (e.g., $AlBr_4^-$), nitrate, nitrite, sulfate, sulfite, phosphate, phosphite, arsenate, hexafluoroarsenate ($AsF_6^-$), antimonate, hexafluoroantimonate ($SbF_6^-$), selenate, tellurate, tungstate, molybdate, chromate, silicate, a borate (e.g., borate, diborate, triborate, tetraborate), tetrafluoroborate, anionic borane cluster (e.g., $B_{10}H_{10}^{2-}$ and $B_{12}H_{12}^{2-}$), perrhenate, permanganate, ruthenate, perruthenate, a polyoxometallate, an alkylsulfonimide (including fluoroalkylsulfonylimides, e.g., $(CF_3SO_2)_2N^-$), a sulfonate (e.g., $CH_3SO_3^-$, $CH_3CH_2SO_3^-$, $CH_3(CH_2)_2SO_3^-$, benzenesulfonate, toluenesulfonate, or dodecylbenzenesulfonate), a fluorosulfonate (e.g., $CF_3SO_3^-$, $CF_3CF_2SO_3^-$, $CF_3(CF_2)_2SO_3^-$, or $CHF_2CF_2SO_3^-$), an organoborate (e.g., $BR_1R_2R_3R_4^-$, wherein $R_1$, $R_2$, $R_3$, $R_4$ are typically hydrocarbon groups containing 1 to 6 carbon atoms), dicyanamide (i.e., $N(CN)_2^-$), phosphate, a phosphonate (e.g., methyl phosphonate), or a phosphinate (e.g., bis-(2,4,4-trimethylpentyl)-phosphinate). The lithium salt may alternatively be lithium hydroxide (LiOH) or lithium oxide ($Li_2O$). In some embodiments, any one or more classes or specific types of anions, as provided above, are excluded from the lithium salt or components included in the initial mixture of step (i). The amount of lithium salt included in step (i) may be precisely, at least, or greater than the amount needed to fully relithiate the delithiated cathode material. By being "at least partially soluble" in the ionic liquid, the lithium salt is typically at least or greater than 10%, 20%, 30%, 40%, 50%, 60%, 70%, 80%, or 90% soluble in the ionic liquid. Metal salts containing metal ions other than lithium (e.g., sodium, potassium, transition metal, or main group metal salts or compounds) are typically excluded.

The ionic liquid used in step (i) may be any ionic liquid known in the art. A significant advantage of ionic liquids compared to organic solvents is the low volatility and high thermal stability of most ionic liquids. Thus, in contrast to most organic solvents, ionic liquids can be heated to substantially high temperatures of, for example, 150° C. or 200° C. while maintaining a very low vapor pressure. Such properties make ionic liquids more suited for the higher temperature conditions employed in the present method, while their low vapor pressure makes them substantially less hazardous and amenable to recycling. In some embodiments, an organic solvent or water is substantially or completely excluded from step (i).

The ionic liquid can belong to any of the numerous classes of ionic liquids known in the art, provided it is non-reactive with the cathode material and has the ability to at least partially dissolve the lithium salt. The ionic liquid can be conveniently described by the formula $(Y^+)(X^-)$, wherein $Y^+$ is a cationic component of the ionic liquid and $X^-$ is an anionic component of the ionic liquid. The anion $X^-$ can independently be any of the anions described earlier above for the lithium salt. The formula $(Y^+)(X^-)$ is meant to encompass a cationic component ($Y^+$) having any valency of positive charge, and an anionic component ($X^-$) having any valency of negative charge, provided that the charge contributions from the cationic portion and anionic portion are counterbalanced in order for charge neutrality to be preserved in the ionic liquid molecule. More specifically, the formula $(Y^+)(X^-)$ is meant to encompass the more generic formula $(Y^{+a})_w(X^{-b})_x$, wherein the variables a and b are, independently, non-zero integers, and the subscript variables w and x are, independently, non-zero integers, such that a·w=b·x (wherein the period placed between variables indicates multiplication of the variables). The foregoing generic formula encompasses numerous possible sub-formulas, such as, for example, $(Y^+)(X^-)$, $(Y^{+2})(X^-)_2$, $(Y^+)_2(X^{-2})$, $(Y^{+2})_2(X^{-2})_2$, $(Y^{+3})(X^-)_3$, $(Y^+)_3(X^{-3})$, $(Y^{+3})_2(X^{-2})_3$, and $(Y^{+2})_3(X^{-3})_2$. In some embodiments, as further discussed below, the ionic liquid has a nitrogen-containing or phosphorus-containing cationic portion.

In some embodiments, the cationic group $Y^+$ of the ionic liquid has the generic formula:

(1)

In Formula (1), Z is either N or P, and $R^1$, $R^2$, $R^3$, and $R^4$ are each independently selected from hydrogen atom and hydrocarbon groups (R) having at least one and up to twenty carbon atoms and optionally substituted with one or more heteroatoms selected from fluorine, nitrogen, oxygen, and sulfur, as described above for hydrocarbon groups R, provided that at least one of $R^1$, $R^2$, $R^3$, and $R^4$ is a hydrocarbon group R when Z is N, and provided that $R^1$, $R^2$, $R^3$, and $R^4$ are all hydrocarbon groups when Z is P. In some embodiments, one, two, three, or all of R', $R^2$, $R^3$, and $R^4$ are selected from straight-chained or branched alkyl and/or alkenyl groups having at least 1, 2, 3, or 4 and up to 5, 6, 7, 8, 9, 10, 11, 12, 13, 14, 15, 16, 17, 18, 19, or 20 carbon atoms. In other embodiments, one, two, three, or all of $R^1$, $R^2$, $R^3$, and $R^4$ are selected from saturated or unsaturated cyclic hydrocarbon groups, which may be carbocyclic (e.g., cycloalkyl or aryl) or heterocyclic (e.g., heterocycloalkyl or heteroaryl).

In some embodiments of Formula (1), Z is N, which corresponds to ammonium species having the following formula:

(1a)

In Formula (1a), $R^1$, $R^2$, $R^3$, and $R^4$ are each independently selected from hydrogen atom and hydrocarbon groups (R) having at least one and up to twenty carbon atoms and optionally substituted with one or more heteroatoms selected from fluorine, nitrogen, oxygen, and sulfur, as described above for hydrocarbon groups R, provided that at least one of $R^1$, $R^2$, $R^3$, and $R^4$ is a hydrocarbon group R.

In some embodiments, one, two, three, or all of $R^1$, $R^2$, $R^3$, and $R^4$ of Formula (1a) are selected from straight-chained or branched alkyl and/or alkenyl groups having at least 1, 2, 3, or 4 and up to 5, 6, 7, 8, 9, 10, 11, 12, 13, 14, 15, 16, 17, 18, 19, or 20 carbon atoms. Some examples of such ammonium species include methylammonium, ethylammonium, vinylammonium, n-propylammonium, isopropylammonium, allylammonium, n-butylammonium, isobutylammonium, n-pentylammonium, n-hexylammonium, n-heptylammonium, n-octylammonium, 2-ethylhexylammonium, n-nonylammonium, n-decylammonium, n-undecylammonium, n-dodecylammonium, dimethylammonium, diethylammonium, divinylammonium, ethylmethylammonium, dipropylammonium, methylpropylammonium, diisopropylammonium, diallylammonium, dibutylammonium, methylbutylammonium, diisobutylammonium, dipentylammonium, methylpentylammonium, dihexylammonium, diheptylammonium, dioctylammonium, di(2-ethylhexyl)ammonium, dinonylammonium, didecylammonium, didodecylammonium, trimethylammonium, dimethylethylammonium, triethylammonium, trivinylammonium, tripropylammonium, triisopropylammonium, dimethylisopropylammonium, triallylammonium, tributylammonium, triisobutylammonium, diethylisobutylammonium, ethyldiisobutylammonium, tripentylammonium, trihexylammonium, triisohexylammonium, ethyldioctylammonium, trioctylammonium, tris(isooctyl)ammonium, methylbis(2-ethylhexyl)ammonium, tris(2-ethylhexyl)ammonium, trinonylammonium, tridecylammonium, tridodecylammonium, tetramethylammonium, tetraethylammonium, tetravinylammonium, tetrapropylammonium, tetraisopropylammonium, dimethyldiisopropylammonium, tetraallylammonium, tetrabutylammonium, tetraisobutylammonium, dimethyldiisobutylammonium, diethyldiisobutylammonium, methyltriisobutylammonium, ethyltriisobutylammonium, tetrapentylammonium, tetrahexylammonium, tetraisohexylammonium, ethyltrioctylammonium, tetraoctylammonium, tetrakis(isooctyl)ammonium, methyltris(2-ethylhexyl)ammonium, ethyltris(2-ethylhexyl)ammonium, tetrakis(2-ethylhexyl)ammonium, tetranonylammonium, tetradecylammonium, and tetradodecylammonium.

In other embodiments, one, two, three, or all of R', $R^2$, $R^3$, and $R^4$ of Formula (Ia) are selected from saturated or unsaturated cyclic hydrocarbon groups, which may be carbocyclic (e.g., cycloalkyl or aryl) or heterocyclic (e.g., heterocycloalkyl or heteroaryl) and may or may not include a hydrocarbon linker and/or one more hydrocarbon substituents. Some examples of such ammonium species include trimethylcyclopentylammonium, trimethylcyclohexylammonium, trimethylphenylammonium, trimethylbenzylammonium, trimethylnaphthylammonium, triethylcyclopentylammonium, triethylcyclohexylammonium, triethylphenylammonium, triethylbenzylammonium, triisopropylcyclopentylammonium, triisopropylcyclohexylammonium, triisopropylphenylammonium, triisopropylbenzylammonium, dimethylcyclopentylammonium, dimethylcyclohexylammonium, dimethylphenylammonium, dimethylbenzylammonium, diethylcyclopentylammonium, diethylcyclohexylammonium, diethylphenylammonium, diethylbenzylammonium, diisopropylcyclopentylammonium, diisopropylcyclohexylammonium, diisopropylphenylammonium, diisopropylbenzylammonium, dimethyldicyclopentylammonium, dimethyldicyclohexylammonium, dimethyldiphenylammonium, dimethyldibenzylammonium, diethyldicyclopentylammonium, diethyldicyclohexylammonium, diethyldiphenylammonium, diethyldibenzylammonium, diisopropyldicyclopentylammonium, diisopropyldicyclohexylammonium, diisopropyldiphenylammonium, diisopropyldibenzylammonium, dihexyldiphenylammonium, dioctyldiphenylammonium, dihexyldibenzylammonium, dioctyldibenzylammonium, methyltricyclopentylammonium, methyltricyclohexylammonium, methyltriphenylammonium, methyltribenzylammonium, ethyltricyclopentylammonium, ethyltricyclohexylammonium, ethyltriphenylammonium, ethyltribenzylammonium, isopropyltricyclopentylammonium, isopropyltricyclohexylammonium, isopropyltriphenylammonium, hexyltriphenylammonium, octyltriphenylammonium, isopropyltribenzylammonium, hexyltribenzylammonium, octyltribenzylammonium, tetracyclopentylammonium, tetracyclohexylammonium, tetraphenylammonium, and tetrabenzylammonium.

In some embodiments of Formula (1), Z is P, which corresponds to phosphonium species having the following formula:

(1b)

In Formula (1b), R', $R^2$, $R^3$, and $R^4$ are each independently selected from hydrocarbon groups (R) having at least one and up to twenty carbon atoms and optionally substituted with one or more heteroatoms selected from fluorine, nitrogen, oxygen, and sulfur, as described above for hydrocarbon groups R. In some embodiments, one, two, three, or all of R', $R^2$, $R^3$, and $R^4$ are selected from straight-chained or branched alkyl and/or alkenyl groups having at least 1, 2, 3, or 4 and up to 5, 6, 7, 8, 9, 10, 11, 12, 13, 14, 15, 16, 17, 18, 19, or 20 carbon atoms, or at least 5, 6, 7, or 8 and up to 9, 10, 11, 12, 13, 14, 15, 16, 17, 18, 19, or 20 carbon atoms. In other embodiments, one, two, three, or all of $R^1$, $R^2$, $R^3$, and $R^4$ are selected from saturated or unsaturated cyclic hydrocarbon groups, which may be carbocyclic (e.g., cycloalkyl or aryl) or heterocyclic (e.g., heterocycloalkyl or heteroaryl).

In some embodiments of Formula (1b), $R^1$, $R^2$, $R^3$, and $R^4$ are selected from straight-chained or branched alkyl and/or alkenyl groups having at least 1, 2, 3, or 4 and up to 5, 6, 7, 8, 9, 10, 11, 12, 13, 14, 15, 16, 17, 18, 19, or 20 carbon atoms. Some examples of such phosphonium species include tetramethylphosphonium, tetraethylphosphonium, tetravinylphosphonium, tetrapropylphosphonium, tetraisopropylphosphonium, dimethyldiisopropylphosphonium, tetraallylphosphonium, tetrabutylphosphonium, tetraisobutylphosphonium, dimethyldiisobutylphosphonium, diethyldiisobutylphosphonium, methyltriisobutylphosphonium, ethyltriisobutylphosphonium, tetrapentylphosphonium, tetrahexylphosphonium, tetrakis(isohexyl)phosphonium, ethyltrioctylphosphonium, tetraoctylphosphonium, tetrakis(isooctyl)phosphonium, methyltris(2-ethylhexyl) phosphonium, ethyltris(2-ethylhexyl)phosphonium, tetrakis (2-ethylhexyl)phosphonium, trihexyldodecylphosphonium, tetranonylphosphonium, tetradecylphosphonium, and tetradodecylphosphonium.

In other embodiments, one, two, three, or all of $R^1$, $R^2$, $R^3$, and $R^4$ of Formula (1b) are selected from saturated or unsaturated cyclic hydrocarbon groups, which may be carbocyclic (e.g., cycloalkyl or aryl) or heterocyclic (e.g., heterocycloalkyl or heteroaryl) and may or may not include a hydrocarbon linker and/or one more hydrocarbon substituents. Some examples of such phosphonium species include trimethylcyclopentylphosphonium, trimethylcyclohexylphosphonium, trimethylphenylphosphonium, trimethylbenzylphosphonium, trimethylnaphthylphosphonium, triethylcyclopentylphosphonium, triethylcyclohexylphosphonium, triethylphenylphosphonium, triethylbenzylphosphonium, triisopropylcyclopentylphosphonium, triisopropylcyclohexylphosphonium, triisopropylphenylphosphonium, triisopropylbenzylphosphonium, dimethyldicyclopentylphosphonium, dimethyldicyclohexylphosphonium, dimethyldiphenylphosphonium, dimethyldibenzylphosphonium, diethyldicyclopentylphosphonium, diethyldicyclohexylphosphonium, diethyldiphenylphosphonium, diethyldibenzylphosphonium, diisopropyldicyclopentylphosphonium, diisopropyldicyclohexylphosphonium, diisopropyldiphenylphosphonium, diisopropyldibenzylphosphonium, dihexyldiphenylphosphonium, dioctyldiphenylphosphonium, dihexyldibenzylphosphonium, dioctyldibenzylphosphonium, methyltricyclopentylphosphonium, methyltricyclohexylphosphonium, methyltriphenylphosphonium, methyltribenzylphosphonium, ethyltricyclopentylphosphonium, ethyltricyclohexylphosphonium, ethyltriphenylphosphonium, ethyltribenzylphosphonium, isopropyltricyclopentylphosphonium, isopropyltricyclohexylphosphonium, isopropyltriphenylphosphonium, hexyltriphenylphosphonium, octyltriphenylphosphonium, dodecyltriphenylphosphonium, isopropyltribenzylphosphonium, hexyltribenzylphosphonium, octyltribenzylphosphonium, tetracyclopentylphosphonium, tetracyclohexylphosphonium, tetraphenylphosphonium, and tetrabenzylphosphonium.

In the cationic species of Formula (1), two or more of R', $R^2$, $R^3$, and $R^4$ may (i.e., optionally) be combined to form one or more cyclic groups that includes Z as a ring heteroatom. By analogy, two or more of $R^1$, $R^2$, $R^3$, and $R^4$ of Formula (1a), or two or more of $R^1$, $R^2$, $R^3$, and $R^4$ of Formula (1b), may (i.e., optionally) be combined to form one or more cyclic groups that includes N or P, respectively, as a ring heteroatom. Thus, if $R^1$ and $R^2$ are taken as ethyl groups, le and $R^2$ may interconnect to form a five-membered ring that includes Z. The interconnected moiety may also contain one or more heteroatoms as a ring heteroatom, in addition to Z. Alternatively, or in addition to two or more of R', $R^2$, $R^3$, and $R^4$ interconnecting to form a ring, two of R', $R^2$, $R^3$, and $R^4$ may (i.e., optionally) be combined to form a group linked to Z by a double bond.

For example, le and $R^2$ in Formula (1a) or in Formula (1b) may be interconnected to result in a cationic species having any of the following formulas:

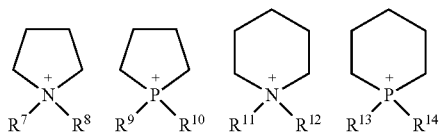

In the above formulas, $R^7$, $R^8$, $R^9$, $R^{10}$, $R^{11}$, $R^{12}$, $R^{13}$, and $R^{14}$ are each independently selected from hydrogen atom and hydrocarbon groups (R) having at least one and up to twenty carbon atoms and optionally substituted with one or more heteroatoms selected from fluorine, nitrogen, oxygen, and sulfur, as described above for hydrocarbon groups R, provided that $R^9$, $R^{10}$, $R^{13}$ and $R^{14}$ of the cyclic phosphonium species are all hydrocarbon groups R. In some embodiments, $R^7$, $R^8$, $R^9$, $R^{10}$, $R^{11}$, $R^{12}$, $R^{13}$ and $R^{14}$ are each independently selected from hydrocarbon groups (R). Moreover, any of the groups, above, that are not shown as interconnected, may either interconnect with each other to make a second ring that includes N or P, or may interconnect with the existing ring to form a bicyclic structure. Some examples of such structures include:

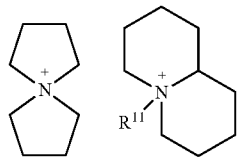

The interconnection of $R^1$ and $R^2$ in Formula (1a) or in Formula (1b) can also include one or more heteroatoms. Some examples of such cationic species include:

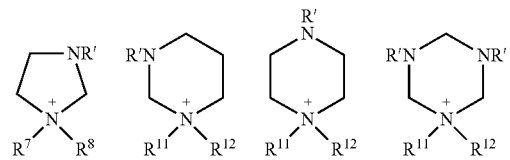

In the above structures, $R^7$, $R^8$, $R^{11}$, and $R^{12}$ are as defined above. The group R' bound to the additional one or more hydrogen atoms is independently selected from hydrogen atom and any of the hydrocarbon groups (R) described above, particularly straight-chained or branched alkyl and/or alkenyl groups having 1, 2, 3, 4, 5, or 6 carbon atoms. Although the above structures show the presence of one or more ring nitrogen atoms, the cyclic cation may also include a ring oxygen atom, such as in a morpholinium-based ionic liquid.

The interconnection of $R^1$ and $R^2$ in Formula (1a) or Formula (1b) can also be accompanied by one or more double bonds in the ring containing N or P. If one of the double bonds is connected to N or P in the ring, then one of $R^3$ and $R^4$ in Formula (1a) or in Formula (1b) participates to make a double bond in the ring. If none of the double bonds are connected to N or P in the ring, then $R^3$ and $R^4$ in Formula (1a) or $R^3$ and $R^4$ in Formula (1b) are not required to participate in making a double bond in the ring, i.e., the double bond originated in this case from one of $R^1$ and $R^2$ in Formula (1a) or one of $R^1$ and $R^2$ in Formula (1b). As above, the interconnection may or may not also include one or more heteroatoms. Some examples of such cationic species include:

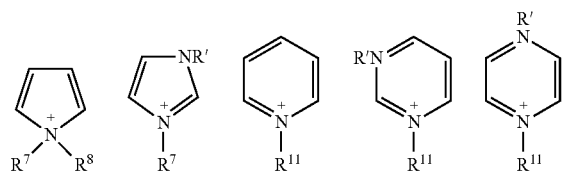

In some embodiments of any of Formulas (1), (1a), (1b), or sub-formula or specific compound(s) thereof, one or more hydrocarbon groups is a heteroatom-containing alkyl group containing 1-12 or 1-6 carbon atoms, wherein the heteroatoms are typically selected from one or more oxygen, nitrogen, and/or sulfur atoms. In particular embodiments, the heteroatom-containing alkyl group contains a heteroatom-containing group selected from hydroxy, thiol, ether (OR), thioether (SR), polyether (polyalkylene oxide), or amino (NR'2) groups. Some examples of such groups include —$CH_2OH$, —$CH_2CH_2OH$, —$CH_2CH(OH)CH_3$, —$CH_2CH_2CH_2OH$, —$CH_2CH_2CH_2CH_2OH$, —$CH_2SH$, —CH$_2$CH$_2$SH, —CH$_2$CH(SH)CH$_3$, —CH$_2$CH$_2$OCH$_2$CH$_2$OH, —CH$_2$CH$_2$OCH$_2$CH$_2$OCH$_2$CH$_2$OH, —CH$_2$CH$_2$(OCH$_2$CH$_2$)$_y$OH, (where y is, e.g., 2, 3, 4, 5, or 6), —CH$_2$OCH$_3$, —CH$_2$CH$_2$OCH$_3$, —CH$_2$CH(OCH$_3$)CH$_3$, —CH$_2$CH$_2$CH$_2$OCH$_3$, —CH$_2$CH$_2$–CH$_2$CH$_2$OCH$_3$, —CH$_2$CH$_2$OCH$_2$CH$_2$OCH$_3$, —CH$_2$CH$_2$O—CH$_2$CH$_2$OCH$_2$CH$_2$OCH$_3$, —CH$_2$CH$_2$(OCH$_2$CH$_2$)$_y$OCH$_3$, (where y is, e.g., 2, 3, 4, 5, or 6), —CH$_2$NH$_2$, —CH$_2$CH$_2$NH$_2$, —CH$_2$CH(NH$_2$)CH$_3$, —CH$_2$CH$_2$CH$_2$NH$_2$, —CH$_2$CH$_2$CH$_2$CH$_2$NH$_2$, —CH$_2$CH$_2$OCH$_2$CH$_2$NH$_2$, —CH$_2$CH$_2$OCH$_2$CH$_2$OCH$_2$CH$_2$NH$_2$, and —CH$_2$CH$_2$(OCH$_2$CH$_2$)$_y$.NH$_2$, (where y is, e.g., 2, 3, 4, 5, or 6).

In particular embodiments, the ionic liquid possesses an imidazolium species as the cationic r species. The imidazolium-based ionic liquid may have a structure of the general formula:

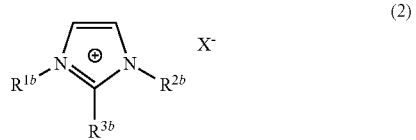

(2)

In Formula (2) above, $R^{1b}$, $R^{2b}$ and $R^{3b}$ are each independently a saturated or unsaturated, straight-chained, branched, or cyclic hydrocarbon group (R), as described above, particularly those hydrocarbon groups containing at least 1, 2, or 3 and up to 4, 5, 6, 7, 8, 9, 10, 11, or 12 carbon atoms. In typical embodiments, $R^{3b}$ is a hydrogen atom instead of a hydrocarbon group, but $R^{3b}$ may, in some embodiments, be a hydrocarbon group (R). The anion X" can independently be any of the anions described earlier above for the lithium salt. In some embodiments, $R^{1b}$ and $R^{2b}$, or $R^{1b}$ and $R^{3b}$, or $R^{2b}$ and $R^{3b}$ are different in structure or number of carbon atoms, whereas, in other embodiments, $R^{1b}$ and $R^{2b}$, or $R^{1b}$ and $R^{3b}$, or $R^{2b}$ and $R^{3b}$ are the same either in structure or number of carbon atoms. In different embodiments, $R^{1b}$, $R^{2b}$ and/or $R^{3b}$ independently have a minimum of at least 1, 2, 3, 4, 5, 6, 7, or 8 carbon atoms, wherein $R^{3b}$ may be hydrogen while $R^{1b}$ and $R^{2b}$ are hydrocarbon groups. In other embodiments, $R^{1b}$, $R^{2b}$ and/or $R^{3b}$ independently have a maximum of 2, 3, 4, 5, 6, 7, 8, 9, 10, 11, 12, 13, 14, 15, 16, 17, or 18 carbon atoms, wherein $R^{3b}$ may be hydrogen while $R^{1b}$ and $R^{2b}$ are hydrocarbon groups. In other embodiments, $R^{1b}$, $R^{2b}$ and/or $R^{3b}$ independently have a number of carbon atoms within a range of carbon atoms bounded by any of the exemplary minimum and maximum carbon numbers provided above.

In particular embodiments of Formula (2), one or more of $R^{1b}$, $R^{2b}$ and $R^{3b}$ is a heteroatom-containing alkyl group containing 1-12 or 1-6 carbon atoms, wherein the heteroatoms are typically selected from one or more oxygen and/or nitrogen atoms. In particular embodiments, the heteroatom-containing group is selected from hydroxy, ether (OR), polyether (polyalkylene oxide), or amino (NR'2) groups. Some examples of heteroatom-containing groups include —CH$_2$OH, —CH$_2$CH$_2$OH, —CH$_2$CH(OH)CH$_3$, —CH$_2$CH$_2$CH$_2$OH, —CH$_2$CH$_2$CH$_2$CH$_2$OH, —CH$_2$SH, —CH$_2$CH$_2$SH, —CH$_2$CH(SH)CH$_3$, —CH$_2$CH$_2$OCH$_2$CH$_2$OH, —CH$_2$CH$_2$OCH$_2$CH$_2$OCH$_2$CH$_2$OH, —CH$_2$CH$_2$(OCH$_2$CH$_2$)$_y$OH, (where y is, e.g., 2, 3, 4, 5, or 6), —CH$_2$OCH$_3$, —CH$_2$CH$_2$OCH$_3$, —CH$_2$CH(OCH$_3$)CH$_3$, —CH$_2$CH$_2$CH$_2$OCH$_3$, —CH$_2$CH$_2$CH$_2$CH$_2$OCH$_3$, —CH$_2$CH$_2$OCH$_2$CH$_2$O—CH$_3$, —CH$_2$CH$_2$O—CH$_2$CH$_2$OCH$_2$CH$_2$OCH$_3$, —CH$_2$CH$_2$(OCH$_2$CH$_2$)$_y$OCH$_3$, (where y is, e.g., 2, 3, 4, 5, or 6), —CH$_2$NH$_2$, —CH$_2$CH$_2$NH$_2$, —CH$_2$CH(NH$_2$)CH$_3$, —CH$_2$CH$_2$CH$_2$NH$_2$, —CH$_2$CH$_2$–CH$_2$CH$_2$NH$_2$, —CH$_2$CH$_2$OCH$_2$CH$_2$NH$_2$, —CH$_2$CH$_2$OCH$_2$CH$_2$O—CH$_2$CH$_2$NH$_2$, and —CH$_2$CH$_2$(OCH$_2$CH$_2$)$_y$-+NH$_2$, (where y is, e.g., 2, 3, 4, 5, or 6). In some embodiments, at least one of $R^{1b}$, $R^{2b}$, and $R^{3b}$ (or more specifically, one or both of $R^{1b}$ and $R^{3b}$) contains a hydroxy group. As the double bonds shown in Formula (2) are generally delocalized, other structurally equivalent (tautomeric) depictions may be possible for the imidazolium ring.

Some general examples of ionic liquids according to Formula (2) include 1,3-dimethylimidazolium$^+$X$^-$, 1,2,3-trimethylimidazolium$^+$X$^-$, 2-ethyl-1,3-dimethylimidazolium$^+$X$^-$, 2-n-propyl-1,3-dimethylimidazolium$^+$X$^-$, 2-n-butyl-1,3-dimethylimidazolium$^+$X$^-$, 1-ethyl-2,3-dimethylimidazolium$^+$X$^-$, 1-n-propyl-2,3-dimethylimidazolium$^+$X$^-$, 1-n-butyl-2,3-dimethylimidazolium$^+$X$^-$, 1-methyl-3-ethylimidazolium$^+$X$^-$, 1-methyl-3-n-propylimidazolium$^+$X$^-$, 1-methyl-3-isopropylimidazolium$^+$X$^-$, 1-butyl-3-methylimidazolium$^+$X$^-$ (i.e., BMIM$^+$X$^-$), 1-isobutyl-3-methylimidazolium$^+$X$^-$, 1,3-diethylimidazolium$^+$X$^-$, 1-ethyl-3-n-propylimidazolium$^+$X$^-$, 1-ethyl-3-isopropylimidazolium$^+$X$^-$, 1-ethyl-3-n-butylimidazolium$^+$X$^-$, 1-ethyl-3-isobutylimidazolium$^+$X$^-$, 1-ethyl-3-sec-butylimidazolium$^+$X$^-$, 1-ethyl-3-t-butylimidazolium$^+$X$^-$, 1,3-di-n-propylimidazolium$^+$X$^-$, 1-n-propyl-3-isopropylimidazolium$^+$X$^-$, 1-n-propyl-3-n-butylimidazolium$^+$X$^-$, 1-n-propyl-3-isobutylimidazolium$^+$X$^-$, 1-n-propyl-3-sec-butylimidazolium$^+$X$^-$, 1-n-propyl-3-t-butylimidazolium$^+$X$^-$, 1,3-diisopropylimidazolium$^+$X$^-$, 1-isopropyl-3-n-butylimidazolium$^+$X$^-$, 1-isopropyl-3-isobutylimidazolium$^+$X$^-$, 1-isopropyl-3-sec-butylimidazolium$^+$X$^-$, 1-isopropyl-3-t-butylimidazolium$^+$X$^-$, 1,3-di-n-butylimidazolium$^+$X$^-$, 1-n-butyl-3-isobutylimidazolium$^+$X$^-$, 1-n-butyl-3-sec-butylimidazolium$^+$X$^-$, 1-n-butyl-3-t-butylimidazolium$^+$X$^-$, 1,3-diisobutylimidazolium$^+$X$^-$, 1-isobutyl-3-sec-butylimidazolium$^+$X$^-$, 1-isobutyl-3-t-butylimidazolium$^+$X$^-$, 1,3-di-sec-butylimidazolium$^+$X$^-$, 1-sec-butyl-3-t-butylimidazolium$^+$X$^-$, 1,3-di-t-butylimidazolium$^+$X$^-$, 1-methyl-3-pentylimidazolium$^+$X$^-$, 1-methyl-3-hexylimidazolium$^+$X$^-$, 1-methyl-3-heptylimidazolium$^+$X$^-$, 1-methyl-3-octylimidazolium$^+$X$^-$, 1-methyl-3-decylimidazolium$^+$X$^-$, 1-methyl-3-dodecylimidazolium$^+$X$^-$, 1-methyl-3-tetradecylimidazolium$^+$X$^-$, 1-methyl-3-hexadecylimidazolium$^+$X$^-$, 1-methyl-3-octadecylimidazolium$^+$X$^-$, 1-allyl-3-methylimidazolium$^+$X$^-$, 1-(2-hydroxyethyl)-3-methylimidazolium$^+$X$^-$, 1-(2-hydroxyethyl)-3-ethylimidazolium$^+$X$^-$, 1-(2-hydroxyethyl)-3-(n-propyl)imidazolium$^+$X$^-$, 1-(2-hydroxyethyl)-3-(n-butyl)imidazolium$^+$X$^-$, 1-(1-hydroxyethyl)-3-methylimidazolium$^+$X$^-$, 1-(3-hydroxy-n-propyl)-3-methylimidazolium$^+$X$^-$, 1-(3-hydroxy-n-propyl)-3-ethylimidazolium$^+$X$^-$, 1-(3-hydroxy-n-propyl)-3-(n-propyl)imidazolium$^+$X$^-$, 1-(3-hydroxy-n-propyl)-3-(n-butyl)imidazolium$^+$X$^-$, 1-(2-hydroxy-n-propyl)-3-methylimidazolium$^+$X$^-$, 1-(2-hydroxy-n-propyl)-3-ethylimidazolium$^+$X$^-$, 1-(2-hydroxy-n-propyl)-3-(n-propyl)imidazolium$^+$X$^-$, 1-(2-hydroxy-n-propyl)-3-(n-butyl)imidazolium$^+$X$^-$, 1-(2-methoxyethyl)-3-methylimidazolium$^+$1-(2-methoxyethyl)-3-ethylimidazolium$^+$X$^-$, 1-(2-methoxyethyl)-3-(n-propyl)imidazolium$^+$X$^-$, 1-(2-methoxyethyl)-3-(n-butyl)imidazolium$^+$1-(2-aminoethyl)-3-methylimidazolium$^+$X$^-$, 1-(2-aminoethyl)-3-ethylimidazolium⁺X⁻, 1-(2-aminoethyl)-3-(n-propyl)imidazolium⁺X⁻, and 1-(2-aminoethyl)-3-(n-butyl)imidazolium⁺X⁻. For any of the foregoing examples, the anion X⁻ can independently be any of the anions described earlier above for the lithium salt.

In Formula (2), one or both of the hydrogen atoms at the 4- and 5-positions may also be substituted with a group, such as a hydrocarbon group, such as any of the hydrocarbon groups described above, or an alkoxide group (—OR), hydroxy group (OH), amino group (—NH$_2$, —NHR, or —NR$_2$), carboxamide group (—C(O)NR$_2$ wherein one or both R groups can be replaced with H), and/or halogen atom (e.g., F, Cl, Br, or I atom), wherein the R groups may be the same or different and may or may not be interconnected to form a ring. For example, one or both of the 4- and 5-positions of the imidazole ring may be substituted with a methyl, ethyl, n-propyl, isopropyl, n-butyl, isobutyl, sec-butyl, or t-butyl group. R³ at the 2-position may also be selected from any of the foregoing groups provided for the 4- and 5-positions, independent of whether the 4- and 5-positions are substituted or unsubstituted. Moreover, any one or more of $R^{1b}$, $R^{2b}$ and $R^{3b}$ may or may not also include an imidazole or imidazolium ring, which therefore may result in a bi-imidazolium, tri-imidazolium, or tetra-imidazolium cationic portion. In other embodiments, one or both of the hydrogen atoms at the 4- and 5-positions is/are not substituted with a group at one or both of those positions.

In some embodiments of Formula (2), $R^{1b}$ and $R^{3b}$, or $R^{2b}$ and $R^{3b}$ are interconnected, thereby forming an imidazolyl-containing bicyclic ring system. The interconnection can be saturated or unsaturated, and may or may not include substituting groups, as described above for the hydrocarbon groups R provided above. Some examples of ionic liquids containing such imidazolyl-containing bicyclic ring systems include those according to the following formulas:

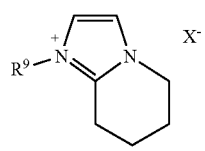

(2a)

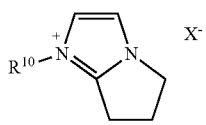

(2b)

In Formulas (2a) and (2b), R⁹ and R¹⁰ independently represent a hydrocarbon group, with or without heteroatom substitution, such as any of the hydrocarbon groups (R) described above for $R^{1b}$, $R^{2b}$ and $R^{3b}$ of Formula (2). In particular embodiments, R⁹ and R¹⁰ are independently selected from methyl, ethyl, n-propyl, isopropyl, n-butyl, isobutyl, sec-butyl, t-butyl, n-pentyl, isopentyl, neopentyl, n-hexyl, isohexyl, vinyl, and allyl groups. Any of the hydrogen atoms at available carbon atoms in Formulas (2a) and (2b) may be substituted with a group, such as a hydrocarbon group, such as any of the hydrocarbon groups (R) described above, an alkoxide group (—OR), hydroxy group (OH), amino group (—NH$_2$, —NHR, or —NR$_2$), carboxamide group (—C(O)NR$_2$ wherein one or both R groups can be replaced with H), and/or halogen atom (e.g., F, Cl, Br, or I atom), wherein the R groups may be the same or different and may or may not be interconnected to form a ring.

In other particular embodiments, the ionic liquid is an N-hydrocarbylpyridinium-based ionic liquid having a structure of the general formula:

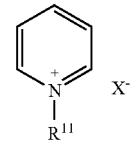

(3)

In Formula (3), R¹¹ represents a hydrocarbon group, with or without heteroatom substitution, such as any of the hydrocarbon groups (R) described earlier above under, and the anion X⁻ can independently be any of the anions described earlier above for the lithium salt. Some general examples of N-alkylpyridinium-based ionic liquids include N-methylpyridinium⁺X⁻, N-ethylpyridinium⁺X⁻, N-n-propylpyridinium⁺X⁻, N-isopropylpyridinium⁺X⁻, N-n-butylpyridinium⁺X⁻, N-isobutylpyridinium⁺X⁻, N-sec-butylpyridinium⁺X⁻, N-t-butylpyridinium⁺X⁻, N-n-pentylpyridinium⁺X⁻, N-isopentylpyridinium⁺X⁻, N-neopentylpyridinium⁺X⁻, N-n-hexylpyridinium⁺X⁻, N-n-heptylpyridinium⁺X⁻, N-n-octylpyridinium⁺X⁻, N-n-nonylpyridinium⁺X⁻, N-n-decylpyridinium⁺X⁻, N-n-undecylpyridinium⁺X⁻, N-n-dodecylpyridinium⁺X⁻, N-n-tridecylpyridinium⁺X⁻, N-n-tetradecylpyridinium⁺X⁻, N-n-pentadecylpyridinium⁺X⁻, N-n-hexadecylpyridinium⁺X⁻, N-n-heptadecylpyridinium⁺X⁻, N-n-octadecylpyridinium⁺X⁻, N-vinylpyridinium⁺X⁻, N-allylpyridinium⁺X⁻, N-phenylpyridinium⁺X⁻, N-(2-hydroxyethyl)pyridinium⁺X⁻, N-benzylpyridinium⁺X⁻, and N-phenethylpyridinium⁺X⁻.

In Formula (3), any one or more of the hydrogen atoms on the ring carbon atoms can be substituted with one or more hydrocarbon groups (R) or heteroatom-containing groups, as described earlier above. In particular embodiments, the heteroatom-containing group may be, for example, alkoxide (—OR), hydroxy (OH), hydroxyalkyl (e.g., hydroxyethyl), amino (—NH$_2$, —NHR, or —NR$_2$), carboxamide (—C(O)NR$_2$ wherein one or both R groups can be replaced with H), and/or halogen atom (e.g., F, Cl, Br, or I atom), wherein the R groups may be the same or different and may or may not be interconnected to form a ring. Some examples of such ionic liquids include N-methyl-4-methylpyridinium X⁻, N-ethyl-4-methylpyridinium X⁻, N-methyl-4-ethylpyridinium X⁻, N-methyl-4-isopropylpyridinium X⁻, N-isopropyl-4-methylpyridinium X⁻, and N-octyl-4-methylpyridinium X. Moreover, any one or two of the ring carbon atoms ortho, meta, or para to the shown ring nitrogen atom in the pyridinium ring may be replaced with a respective number of ring nitrogen atoms, which may be neutral or positively charged ring nitrogen atoms.

In other particular embodiments, the ionic liquid is a cyclic guanidinium-based ionic liquid. The cyclic guanidinium-based ionic liquid can have any of the structures known in the art, including those described in U.S. Pat. No. 8,129,543 and M. G. Bogdanov, et al., Z. *Naturforsch*, 65b, pp. 37-48, 2010, the contents of which are herein incorporated by reference in their entirety.

The cyclic guanidinium-based ionic liquid can be described by the following general formula:

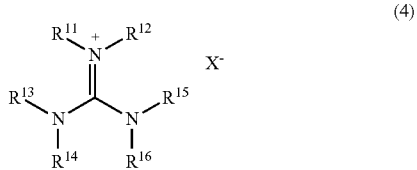
(4)

In Formula (4) above, $R^{11}$, $R^{12}$, $R^{13}$, $R^{14}$, $R^{15}$, and/or $R^{16}$ groups independently represent a hydrocarbon group, with or without heteroatom substitution, such as any of the hydrocarbon groups (R) described above, or a hydrogen atom, provided that at least two of $R^{11}$, $R^{12}$, $R^{13}$, $R^{14}$, $R^{15}$, and $R^{16}$ are interconnected to form a ring or a bicyclic, tricyclic, or higher cyclic ring system. In some embodiments, $R^{11}$, $R^{12}$, $R^{13}$, $R^{14}$, $R^{15}$, and/or $R^{16}$ groups are independently selected from methyl, ethyl, n-propyl, isopropyl, n-butyl, isobutyl, sec-butyl, t-butyl, n-pentyl, isopentyl, neopentyl, n-hexyl, isohexyl, vinyl, and allyl groups, provided that at least two of $R^{11}$, $R^{12}$, $R^{13}$, $R^{14}$, $R^{15}$, and $R^{16}$ are interconnected to form a ring or a bicyclic, tricyclic, or higher cyclic ring system. In a first set of embodiments, $R^{11}$ and $R^{12}$ are interconnected. In a second set of embodiments, $R^{13}$ and $R^{14}$, or $R^{15}$ and $R^{16}$, are interconnected. In a third set of embodiments, $R^{11}$ and $R^{13}$, or $R^{12}$ and $R^{15}$, are interconnected. In a fourth set of embodiments, $R^{14}$ and $R^{16}$ are interconnected. In other embodiments, any two or three of the foregoing types of interconnections are combined. The foregoing embodiments also include the possibility that all of $R^{11}$, $R^{12}$, $R^{13}$, $R^{14}$, $R^{15}$, and $R^{16}$ groups are engaged in an interconnection. The anion $X^-$ can independently be any of the anions described earlier above for the lithium salt.

In other particular embodiments, the ionic liquid is a piperidinium-based ionic liquid having a structure of the following general formula:

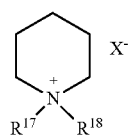
(5)

In Formula (5), $R^{17}$ and $R^{18}$ independently represent a hydrocarbon group, with or without heteroatom substitution, such as any of the hydrocarbon groups (R) described above, and the anion $X^-$ can independently be any of the anions described earlier above for the lithium salt. Some examples of piperidinium-based ionic liquids include 1,1-dimethylpiperidinium$^+$X$^-$, 1-methyl-1-ethylpiperidinium$^+$X$^-$, 1-methyl-1-propylpiperidinium$^+$X$^-$, 1-methyl-1-butylpiperidinium$^+$X$^-$, 1-methyl-1-isobutylpiperidinium$^+$X$^-$, 1-methyl-1-pentylpiperidinium$^+$X$^-$, 1-methyl-1-hexylpiperidinium$^+$X$^-$, 1-methyl-1-heptylpiperidinium$^+$X$^-$, 1-methyl-1-octylpiperidinium$^+$X$^-$, 1-methyl-1-decylpiperidinium$^+$X$^-$, 1-methyl-1-dodecylpiperidinium$^+$X$^-$, 1-methyl-1-tetradecylpiperidinium$^+$X$^-$, 1-methyl-1-hexadecylpiperidinium$^+$X$^-$, 1-methyl-1-octadecylpiperidinium$^+$X$^-$, 1,1-diethylpiperidinium$^+$X$^-$, 1,1-dipropylpiperidinium$^+$X$^-$, 1,1-dibutylpiperidinium$^+$X$^-$, and 1,1-diisobutylpiperidinium$^+$X$^-$. In some embodiments, the piperidinium ring shown in Formula (5) may have a ring carbon atom replaced with a heteroatom selected from oxygen (O), sulfur (S), and/or nitrogen (—NR—). Moreover, any of the hydrogen atoms residing on ring carbon atoms may be substituted with one or more groups, such as a hydrocarbon group (R), alkoxide group (—OR), hydroxy group (OH), amino group (—NH$_2$, —NHR, or —NR$_2$), carboxamide group (—C(O)NR$_2$ wherein one or both R groups can be replaced with H), and/or halogen atom (e.g., F, Cl, Br, or I atom), wherein the R groups may be the same or different and may or may not be interconnected to form a ring.

In other particular embodiments, the ionic liquid is a pyrrolidinium-based ionic liquid having a structure of the following general formula:

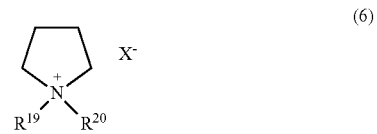
(6)

In Formula (6), $R^{19}$ and $R^{20}$ independently represent a hydrocarbon group, with or without heteroatom substitution, such as any of the hydrocarbon groups (R) described above, and the anion X" can independently be any of the anions described earlier above for the lithium salt. Some examples of pyrrolidinium-based ionic liquids include 1,1-dimethylpyrrolidinium$^+$X$^-$, 1-methyl-1-ethylpyrrolidinium$^+$X$^-$, 1-methyl-1-propylpyrrolidinium$^+$X$^-$, 1-methyl-1-butylpyrrolidinium$^+$X$^-$, 1-methyl-1-isobutylpyrrolidinium$^+$X$^-$, 1-methyl-1-pentylpyrrolidinium$^+$X$^-$, 1-methyl-1-hexylpyrrolidinium$^+$X$^-$, 1-methyl-1-heptylpyrrolidinium$^+$X$^-$, 1-methyl-1-octylpyrrolidinium$^+$X$^-$, 1-methyl-1-decylpyrrolidinium$^+$X$^-$, 1-methyl-1-dodecylpyrrolidinium$^+$X$^-$, 1-methyl-1-tetradecylpyrrolidinium$^+$X$^-$, 1-methyl-1-hexadecylpyrrolidinium$^+$X$^-$, 1-methyl-1-octadecylpyrrolidinium$^+$X$^-$, 1,1-diethylpyrrolidinium$^+$X$^-$, 1,1-dipropylpyrrolidinium$^+$X$^-$, 1,1-dibutylpyrrolidinium$^+$X$^-$, and 1,1-diisobutylpyrrolidinium$^+$X. In some embodiments, the pyrrolidinium ring shown in Formula (6) may have a ring carbon atom replaced with a heteroatom selected from oxygen (O), sulfur (S), and/or nitrogen (—NR—). Moreover, any of the hydrogen atoms residing on ring carbon atoms may be substituted with one or more other groups, such as a hydrocarbon group (R), alkoxide group (—OR), hydroxy group (OH), amino group (—NH$_2$, —NHR, or —NR$_2$), carboxamide group (—C(O)NR$_2$ wherein one or both R groups can be replaced with H), and/or halogen atom (e.g., F, Cl, Br, or I atom), wherein the R groups may be the same or different and may or may not be interconnected to form a ring.

In other particular embodiments, the ionic liquid is a sulfonium-based ionic liquid having a structure of the following general formula:

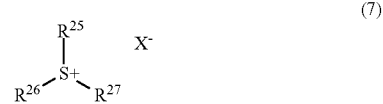
(7)

In Formula (7), $R^{25}$, $R^{26}$, and $R^{27}$ independently represent a hydrocarbon group, with or without heteroatom substitution, such as any of the hydrocarbon groups (R) described above, and the anion X" can independently be any of the anions described earlier above for the lithium salt. Some general examples of sulfonium-based ionic liquids include trimethylsulfonium$^+$X$^-$, dimethylethylsulfonium$^+$X$^-$, diethylmethylsulfonium$^+$X$^-$, triethylsulfonium$^+$X$^-$, dimethylpropylsulfonium$^+$X$^-$, dipropylmethylsulfonium$^+$X$^-$, tripropylsulfonium$^+$X$^-$, dimethylbutylsulfonium$^+$X$^-$, dibutylmethylsulfonium$^+$tributylsulfonium$^+$X$^-$, dimethylhexylsulfonium$^+$X$^-$, dihexylmethylsulfonium$^+$X$^-$, trihexylsulfonium$^+$X$^-$, dimethyloctylsulfonium$^+$X$^-$, dioctylmethylsulfonium$^+$X$^-$, and trioctylsulfonium$^+$X$^-$. In some embodiments of Formula (7), two or three of $R^{25}$, $R^{26}$, and $R^{27}$ are interconnected to form a sulfonium-containing ring or bicyclic ring system, as described above for the phosphonium cyclic systems.

In some embodiments, any of the above general classes or specific types of ionic liquids, or general classes or specific types of cationic portions of the above ionic liquids, are excluded from the mixing process or from the method altogether. Alternatively, in some embodiments, a mixture of two or more of the foregoing ionic liquids is used.

After the initial mixture containing delithiated cathode material, the lithium salt, and ionic liquid is produced, the initial mixture is heated to result in relithiation of the delithiated cathode material. The foregoing step may be referred to as step (ii). The initial mixture is typically heated to a temperature of at least 100° C. to result in relithiation of the delithiated cathode material. In different embodiments, the initial mixture is heated to a processing temperature of precisely, about, or at least, for example, 100° C., 125° C., 150° C., 175° C., 200° C., 225° C., 250° C., 275° C., or 300° C., or a processing temperature within a range bounded by any two of the foregoing temperatures (e.g., 100° C.-300° C., 125° C.-300° C., 150° C.-300° C., 100° C.-250° C., 125° C.-250° C., 150° C.-250° C., 100° C.-200° C., 125° C.-200° C., or 150° C.-200° C.). The initial mixture is heated at any of the above processing temperatures for a suitable period of time that results in relithiation of the delithiated cathode material. The period of time at which the initial mixture resides at any of the above processing temperatures is typically at least 1, 2, 3, 4, 5, or 6 hours and up to 8, 12, 16, 20, 24, 28, 32, or 36 hours. In some embodiments, the initial mixture is gradually elevated in temperature over a period of time (e.g., 10, 20, 30, 60, or 90 minutes) up to any of the foregoing processing temperatures, followed by maintaining the initial mixture at any of the foregoing processing temperatures for any of the above periods of time. The end result of step (ii) is production of a final mixture containing relithiated cathode material and the ionic liquid. In the event that an excess amount of lithium salt is used in the initial mixture in step (i), the final mixture may also include some amount of lithium salt, although in a lower concentration than in the initial mixture.

After the above heating and relithiation step, the ionic liquid is separated from the relithiated cathode material. The foregoing step may be referred to as step (iii). The relithiated cathode material, which is insoluble in the ionic liquid, can be separated from the ionic liquid by any method known in the art capable of separating a liquid from a solid. In one embodiment, the ionic liquid is separated from the relithiated cathode material by centrifugation of the final mixture at the end of step (ii). In another embodiment, the ionic liquid is separated from the relithiated cathode material by filtration of the final mixture at the end of step (ii). In another embodiment, the ionic liquid is separated from the relithiated cathode material by permitting the final mixture at the end of step (ii) to stand for a sufficient period for the relithiated cathode material to settle, followed by decanting of the ionic liquid. The method of separation may also include a combination of methods, e.g., settling, decanting, and filtration, or filtration followed by centrifugation. In some embodiments, after separating the ionic liquid from the relithiated cathode material in step (iii), the ionic liquid is re-used in the method. More specifically, the ionic liquid separated in step (iii) may be used as the source of ionic liquid in step (i).

In some embodiments, after the relithiated cathode material is separated from the ionic liquid in step (iii), the relithiated cathode material may be washed one or more times with a suitable solvent to remove residual ionic liquid and excess lithium salt. The solvent should not be reactive with the relithiated cathode material while capable of dissolving the ionic liquid and excess lithium salt. The solvent is typically polar, such as, for example, acetone, water, or an alcohol (e.g., methanol, ethanol, or isopropanol), or a combination of two or more of these. In further embodiments, the relithiated cathode material, once washed, is subjected to a drying step. In the drying step, the relithiated cathode material is subjected to a drying temperature for a suitable period of time to substantially or completely remove the solvent. The drying temperature is typically at least 50° C. and up to or less than 100° C., 150° C., or 200° C. The relithiated cathode material may be subjected to any of the foregoing drying temperatures for any suitable period of time, such as, for example, 0.5, 1, 2, 3, 4, 5, 6, 12, 18, or 24 hours. In some embodiments, following a washing and/or drying step, the relithiated cathode material is calcined, typically at a temperature above 200° C., more typically at a temperature of precisely, about, or at least 300° C., 350° C., 400° C., 450° C., 500° C., 550° C., 600° C., 650° C., 700° C., 750° C., 800° C., 850° C., or 900° C., or a temperature within a range bounded by any two of the foregoing temperatures (e.g., 300-900° C., 400-900° C., 300-800° C., 400-800° C., 300-700° C., 400-700° C., 300-600° C., or 400-600° C.).

The relithiated cathode material isolated in step (iii) may then be incorporated into a cathode of a lithium-based battery. The relithiated cathode material may be incorporated into any type of lithium-based battery, such as any of the types of lithium-based batteries described earlier above from which spent cathode material was derived. In accordance with conventional practice, the relithiated cathode material may be admixed with an adhesive (e.g., PVDF, PTFE, and co-polymers thereof) in order to be properly molded as an electrode. In some embodiments, the anode (negative) electrode of the battery may be a carbon-based composition in which alkali or other ions can be stored (e.g., intercalated or embedded), such as elemental carbon, or more particularly graphite (e.g., natural or artificial graphite), petroleum coke, carbon fiber (e.g., mesocarbon fibers), or carbon (e.g., mesocarbon) microbeads. The anode may be at least 70 80, 90, or 95 wt % elemental carbon. The anode may alternatively be a metal oxide, such as tin dioxide ($SnO_2$) or titanium dioxide ($TiO_2$), or a composite of carbon and a metal oxide. The anode material may also be admixed with an adhesive (e.g., PVDF, PTFE, and co-polymers thereof) in order to be properly molded as an electrode. Typically, positive and negative current collecting substrates (e.g., Cu or Al foil) are also included. The assembly and manufacture of lithium-based batteries are well known in the art.

Examples have been set forth below for the purpose of illustration and to describe certain specific embodiments of the invention. However, the scope of this invention is not to be in any way limited by the examples set forth herein.

EXAMPLES

Materials

LiCl, LiBr, LiOAc, $Li_2CO_3$, $LiNTf_2$, and DMSO were commercially obtained without further purification. Standard delithiated NCM of composition $Li_{0.9}(Ni_{0.33}Co_{0.33}Mn_{0.33})O_2$ was used. Imidazolium ionic liquids were synthesized according to previously published work (H. Luo, et al., *Sep. Sci. Technol.* 2008, 43, 2473).

Relithiation Procedures

Herein is described an ionothermal strategy for the direct recycling of spent NCM cathodes and a successful relithiation of $LiNi_{1/3}Co_{1/3}Mn_{1/3}O_2$ (NCM 111), in which three different ILs 1-ethyl-3-methylimidazolium bis(trifluoromethanesulfonyl)imide ($[C_2mim][NTf_2]$), 1-butyl-3-methylimidazolium bis(trifluoromethanesulfonyl)imide ($[C_4mim][NTf_2]$), and 1-ethanol-3-methylimidazolium bis(trifluoromethanesulfonyl)imide ($[C_2OHmim][NTf_2]$) were chosen as flux solvent working at 150° C. under ambient pressure. Cost-effective lithium chloride (LiCl) and lithium bromide (LiBr) were chosen as a lithium source. The relithiated NCM 111 (R-NCM) powder was separated from ILs by filtrating and then washing with acetone to make ILs recyclable for a subsequent relithiation process. R-NCM exhibited a recovered structure and excellent electrochemical performance nearly the same as the pristine NCM (P-NCM) sample. The successful relithiation of delithiated NCM 111 (D-NCM) provides a novel method for achieving the direct recycling of spent LIB cathodes. FIG. 1A is a synthetic scheme for producing the ionic liquids $[C_2mim][NTf_2]$, $[C_4mim][NTf_2]$, and $[C_2OHmim][NTf_2]$. FIG. 1B is a schematic showing the ionothermal process for converting delithiated NCM cathode material (D-NCM) to relithiated NCM cathode material (R-NCM).

Stoichiometric amounts of D-NCM black powder (ca. 2.5 mmol) and LiCl or other lithium precursor (ca. 2.5 mmol) were mixed in ILs (ca. 2.5 mL) in a 25 mL glass vial. After stirring for 10 minutes, the vial containing the mixtures was heated in a heating block up to 150-250° C. for about 40 minutes and kept at this temperature for another 6-24 hours. After cooling the mixture to room temperature, the relithiated black powder was separated from the ILs by filtration. The filtered black powder was washed with acetone, ethanol twice, and finally with acetone. The washed black powder was then dried in an oven at approximately 100° C. for about 2 hours. The dried black powder may then be calcined, although, for small scale experiments, calcination was generally not used.

A larger scale (25 g) process was achieved by using about 50 mL of $[C_2mim][NTf_2]$, which was only about 20% of the amount of IL (ionic liquid) used in the initial small scale experiments. The process was conducted as follows: D-NCM black powder (25.3 g, ca. 0.263 mol), LiBr (3.40 g, ca. 0.0392 mol), and ILs (75.3 g, ca. 50 mL) were mixed well in a 150 mL Erlenmeyer flask capped with a rubber septum. The flask containing the mixture was placed inside an oven, which was then heated gradually up to 150° C. within about 30 minutes and was maintained at this temperature for another 6 hours. After the mixture cooled to room temperature, the black powder was separated from the IL by centrifugation and ca. 67.0 g of IL was recovered (ca. 89.0%). The recovered black powder was washed with acetone, ethanol twice, and finally with acetone. The black powder was dried in an oven at about 100° C. for about 1 hour and then calcined at 500° C. for 4 hours. 24.8 g of black powder was obtained (yield: 98.9%).

Figures 2A, 2B:
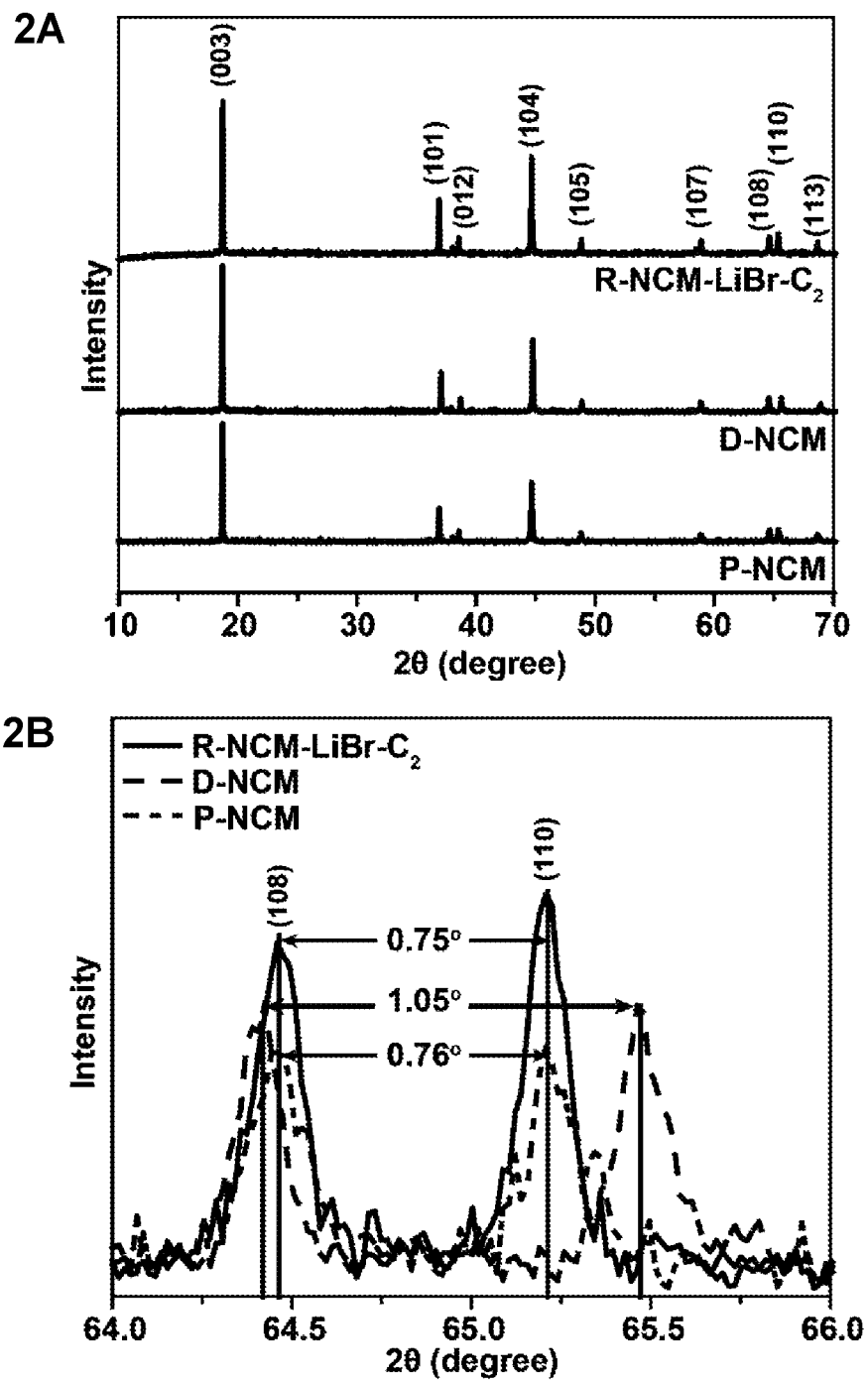
FIGS. 2A-2D.

A standard D-NCM with a chemical composition of $Li_{0.927}Ni_{0.337}Co_{0.331}Mn_{0.332}O_2$ was obtained by chemical delithiation using $NO_2BF_4$ oxidizer (I. Belharouak et al., Electrochem. Commun., 2006, 8, 329). FIG. 2A shows X-ray diffraction (XRD) patterns for P-NCM (pristine NCM), D-NCM (delithiated NCM), and R-NCM-LiBr—$C_2$ (relithiated) material over 10-70 2θ degrees. FIG. 2B shows the XRD patterns over 64-66 2θ degrees. According to the X-ray diffraction (XRD) patterns, D-NCM maintained the O3-type structure of P-NCM, whose diffraction lines can be indexed based on the layered structure of a-$NaFeO_2$. The (108) and (110) diffraction lines of D-NCM shifted away from each other, the peak splitting between (108) and (110) of D-NCM was 1.05° larger than that of P-NCM (0.76°, and the integrated intensity ratio of $4003)_4(104)$ peaks became 2.18, also larger than that of P-NCM (1.76). Those changes in the XRD diagram indicate an expansion of the c parameter in D-NCM, due to the repulsive force generated from $MO_6$ slabs, which are positively charged in a delithiated state. Notably, the (110) diffraction line shifted to higher angles, which indicates a contracted a-axis of D-NCM due to the smaller radius of transition metal ions of higher valences. Thermogravimetric analysis (TGA) under an air atmosphere was used to evaluate the thermal stability of NCM materials (NCMs). D-NCM exhibited about 2.3% weight loss at 800° C., which is much higher than P-NCM (0.2% weight loss at 800° C.). The major weight loss in D-NCM originated from oxygen evolution due to surface reconstruction beginning at 175° C. From the XRD patterns, inductively coupled-plasma optical emission spectroscopy (ICP-OES) results, and TGA curves the crystal structure and chemical composition changes in NCMs were elucidated for the delithiation-relithiation processes.

Figure 2C:
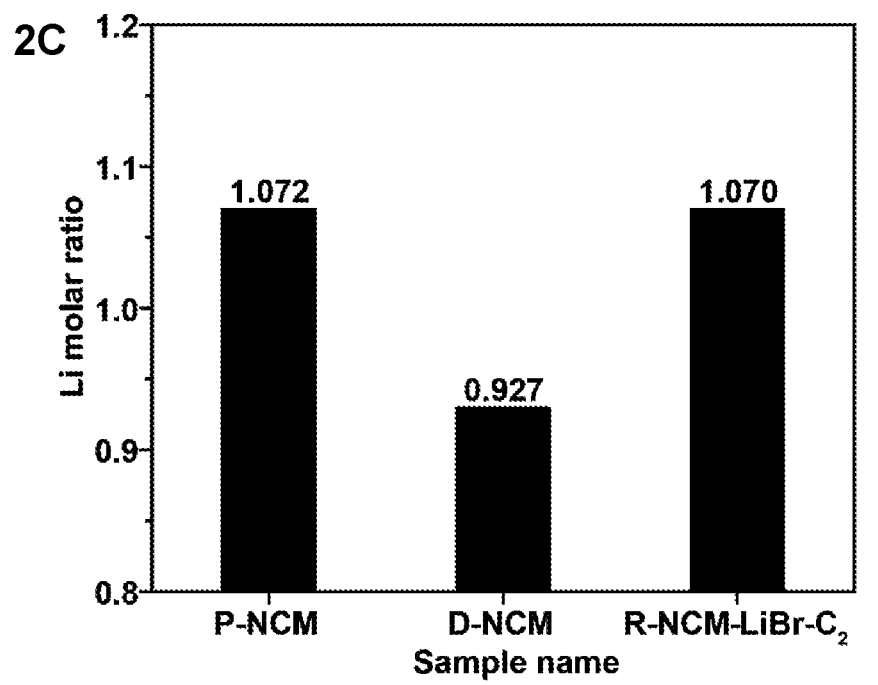
Figure 2D:
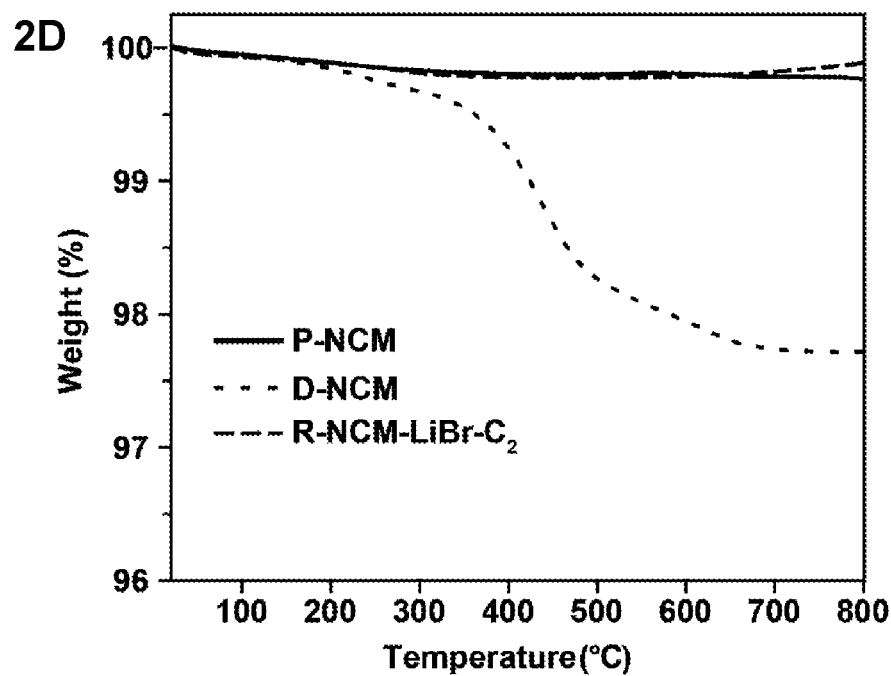

In attempting an efficient relithiation of D-NCM, any impurities should be minimized to the extent possible during the process. Cost-effective LiBr was selected as a preferred lithium source in part because the oxidation product ($Br_2$) can be easily removed from the reaction system by evaporation. Three ILs, $[C_2mim][NTf_2]$, $[C_4mim][NTf_2]$, and $[C_2OHmim][NTf_2]$, were synthesized and selected as ionothermal solvents, in part because of their relatively low cost and excellent thermal stability under 300° C. For a typical relithiation process, D-NCM and LiBr were mixed in $[C_2mim][NTf_2]$ and heated to 150° C. for 6 hours. The relithiated powder was washed with acetone, ethanol, and lastly with acetone, and then dried at 100° C. for 2 hours and calcined at 500° C. for 4 hours (note: relithiated powder denoted as R-NCM-LiBr—$C_2$). As shown in FIG. 2B, the XRD peak changes in D-NCM were successfully recovered in R-NCM-LiBr—$C_2$ because the XRD peak positions of R-NCM-LiBr—$C_2$ became identical to those of P-NCM. The peak splitting between (108) and (110) of R-NCM-LiBr—$C_2$ was 0.75°, which is almost the same as that of P-NCM (0.76°), thus indicating the successful restoration of the crystal structure. The Li molar ratio of R-NCM-LiBr—$C_2$ was calculated to be 1.070 based on the ICP results, which is about the same as that of P-NCM (1.072), thus indicating the successful restoration of the chemical composition (FIG. 2C). The TGA curve of R-NCM-LiBr—$C_2$ coincides with that of P-NCM, which indicates excellent thermal stability of the fully relithiated R-NCM-LiBr—C2 (FIG. 2D). As shown by scanning electron microscopy (SEM), the lack of observable morphological changes after relithiation demonstrates the gentle nature of the ionothermal relithiation process.

Electrochemical Measurements

Cathode slurries were prepared with N-methylpyrrolidone (NMP) by combining 90 wt % NCMs, 5 wt % carbon black, and 5 wt % binder polyvinylidene difluoride (PVDF). The anode slurry was prepared by combining 92 wt % graphite, 6 wt % PVDF, and 2 wt % carbon black. Electrodes were coated and dried using a pilot-scale slot-die coater. Cathodes were coated on Al foil at total loadings between 11.3 and 11.6 mg/cm$^2$. Complementary anodes were coated on Cu foil at a total loading of 4.6 mg/cm$^2$. All electrode drying was performed at 115° C. in a vacuum oven overnight prior to cell assembly. Half coin cells were assembled in an argon-filled glove box by pairing the cathodes with lithium foil anodes. For all cells, Celgard® 2325 was used as the separator material and 1.2 M LiPF$_6$ in 3:7 wt % ethylene carbonate/ethylmethylcarbonate was used as the electrolyte. To aid electrolyte wetting, coin cells were allowed to rest for 4 hours before cycling. Half coin cells were cycled between 3.0 V and 4.3 V vs. Li/Li$^+$. Full coin cells were cycled between 3.0 V and 4.2 V vs. Li/Li$^+$. Full cells were charged using a CCCV protocol (charged to 4.2 V using a constant current, then held at 4.2 V until the current dropped to C/3 before discharging). Four formation cycles were performed (C/10 charge, C/10 discharge) before cycle life testing. Long-term cycle life testing was performed by charging and discharging at 1 C for 40 cycles. All tests were conducted in an environmental chamber at 30° C. using a Maccor battery cycler (Series 4000).

Figures 3A, 3B:
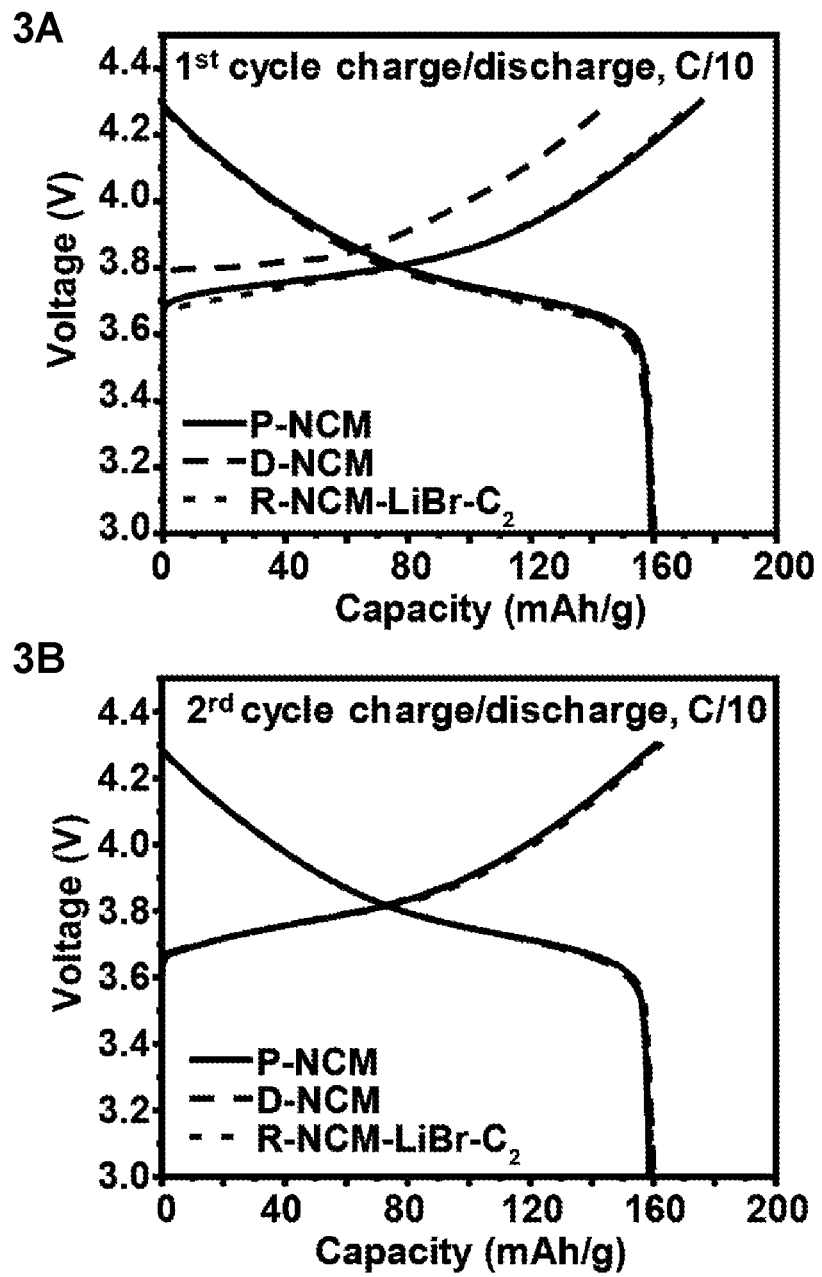
FIGS. 3A-3E.
Figure 3C:
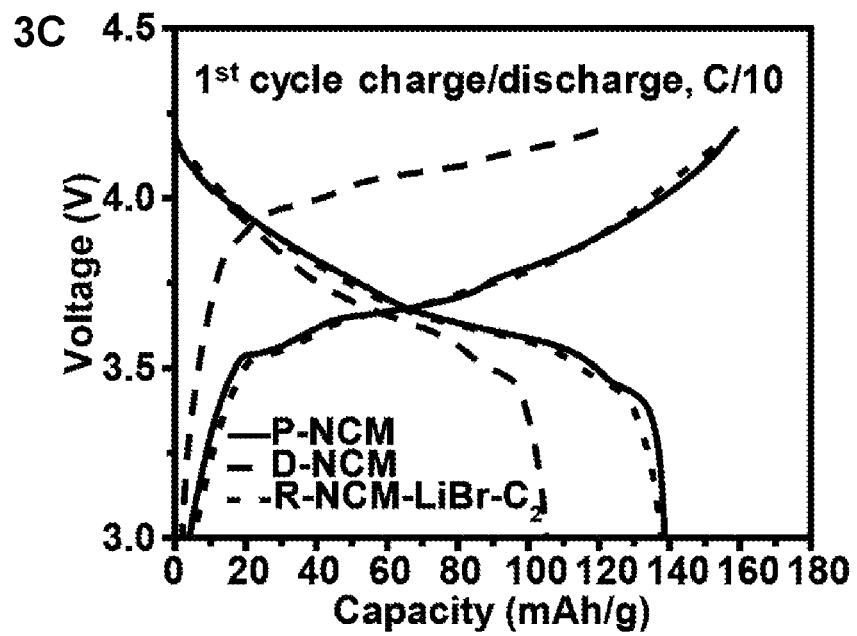
Figure 3D:
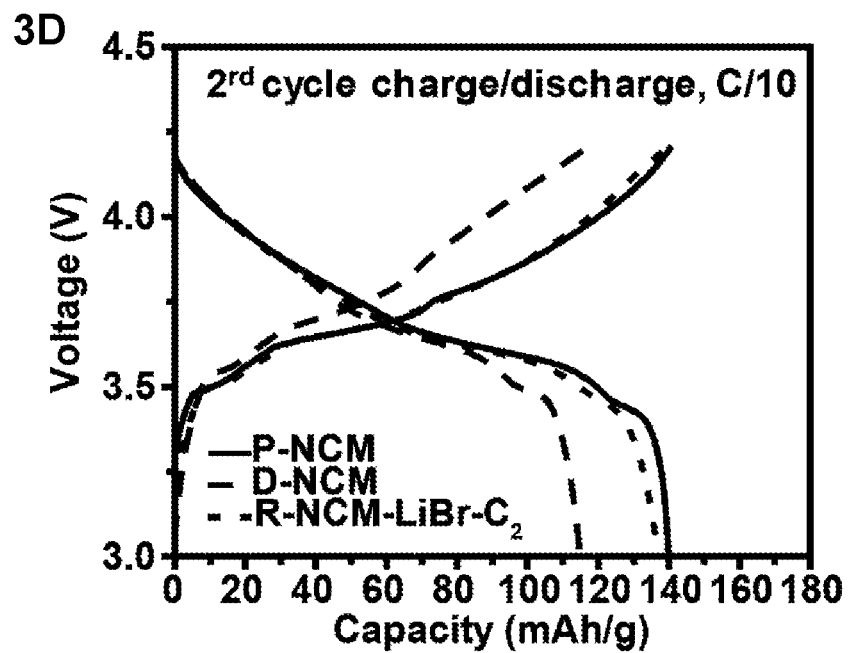
Figure 3E:
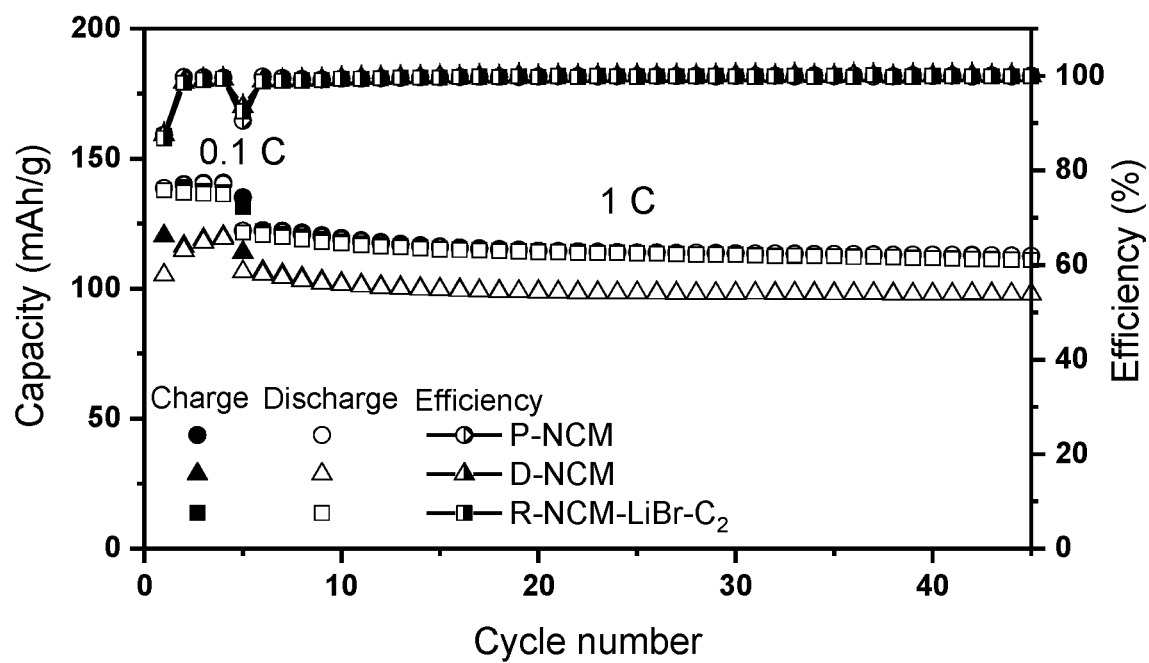

The electrochemical performance of R-NCM-LiBr—C$_2$, D-NCM, and P-NCM were evaluated by both half-cell and full-cell tests. The charge/discharge cycling performance was evaluated in a voltage range of 3-4.3 V at 1C after four activation cycles at C/10 and their voltage profiles at different cycles are compared. FIG. 3A is a graph showing first cycle charge/discharge curves of P-NCM, D-NCM, and R-NCM-LiBr—C$_2$ for half-cell tests. FIG. 3B is a graph showing second cycle charge/discharge curves of P-NCM, D-NCM, and R-NCM-LiBr—C$_2$ for half-cell tests. FIG. 3C is a graph showing first cycle charge/discharge curves of P-NCM, D-NCM, and R-NCM-LiBr—C$_2$ for full-cell tests. FIG. 3D is a graph showing second cycle charge/discharge curves of P-NCM, D-NCM, and R-NCM-LiBr—C$_2$ for full-cell tests. FIG. 3E is a graph showing cycle performance of P-NCM, D-NCM, and R-NCM-LiBr—C$_2$ for full-cell tests. The cathode active material density was as high as 10 mg cm$^{-2}$.

As shown in FIGS. 3A-3E, the charge/discharge curves of R-NCM-LiBr—C$_2$ half-cell almost coincided with that of P-NCM for the first 4 cycles at C/10. Especially for the first cycle, the charge capacity of R-NCM-LiBr—C$_2$ was 173.6 mAh g$^{-1}$, which is as large as that of P-NCM (175.3 mAh g$^{-1}$) and much larger than that of D-NCM (145.9 mAh g$^{-1}$). The qrecovered charge capacity of R-NCM-LiBr—C$_2$ demonstrated the full relithiation of D-NCM. The discharge capacities of P-NCM, D-NCM, and R-NCM-LiBr—C$_2$ are almost the same. The recovered discharge capacity of D-NCM occurred from electrochemical relithiation, which occurs in the half-cell test due to excessive lithium in the lithium foil (M. J. Ganter et al., *J. Power Sources*, 2014, 256, 274). However, the electrochemical relithiation does not happen in practice because no extra lithium can be used for electrochemical relithiation in a commercial full cell. Thus, the full-cell test is the ultimate test to determine whether the relithiated cathode material can function at the same level as a new one.

To simulate real use conditions, a high loading full-cell test was chosen in which the cathode active material density was as high as 10 mg cm$^{-2}$. The matched graphite anode was prepared according to the calculated capacity ratio (1.1:1) of the anode to cathode. The charge/discharge capacities of R-NCM-LiBr—C$_2$ were still as large as those of P-NCM, whereas D-NCM exhibited an attenuated capacity. As shown in FIG. 3E, the cycle stability of R-NCM-LiBr—C$_2$ was also consistent with P-NCM for the first 40 cycles (FIG. 3E). The capacity of R-NCM-LiBr—C$_2$ was still higher than that of D-NCM after 100 cycles, which confirms the good stability of R-NCM-LiBr—C$_2$. Thus, R-NCM-LiBr—C$_2$ has a recovered capacity when used as a LIB cathode. Similarly, R-NCM-LiBr—C$_2$OH using [C$_2$OHmim][NTf$_2$] as the ionic liquid also exhibited a recovered XRD pattern and a fully recovered capacity. Thus, the ionothermal relithiation approach described above has been demonstrated to be an effective way to directly regenerate NCM cathodes.

To shed light on the mechanism of chemical relithiation, ionothermal relithiation was investigated under different reaction conditions, such as by use of other ILs (e.g., [C$_4$mim][NTf$_2$] and [C$_2$OHmim][NTf$_2$]), Li precursors (LiCl, LiNTf$_2$, LiOAc), and different temperatures. The products were named as R-NCM-(Li precursor)-(cation in IL)-(temperature). For example, R-NCMLiCl-C$_2$OH-200 means the product is synthesized using LiCl and [C$_2$OHmim][NTf$_2$] at 200° C.

Figures 4A, 4B:
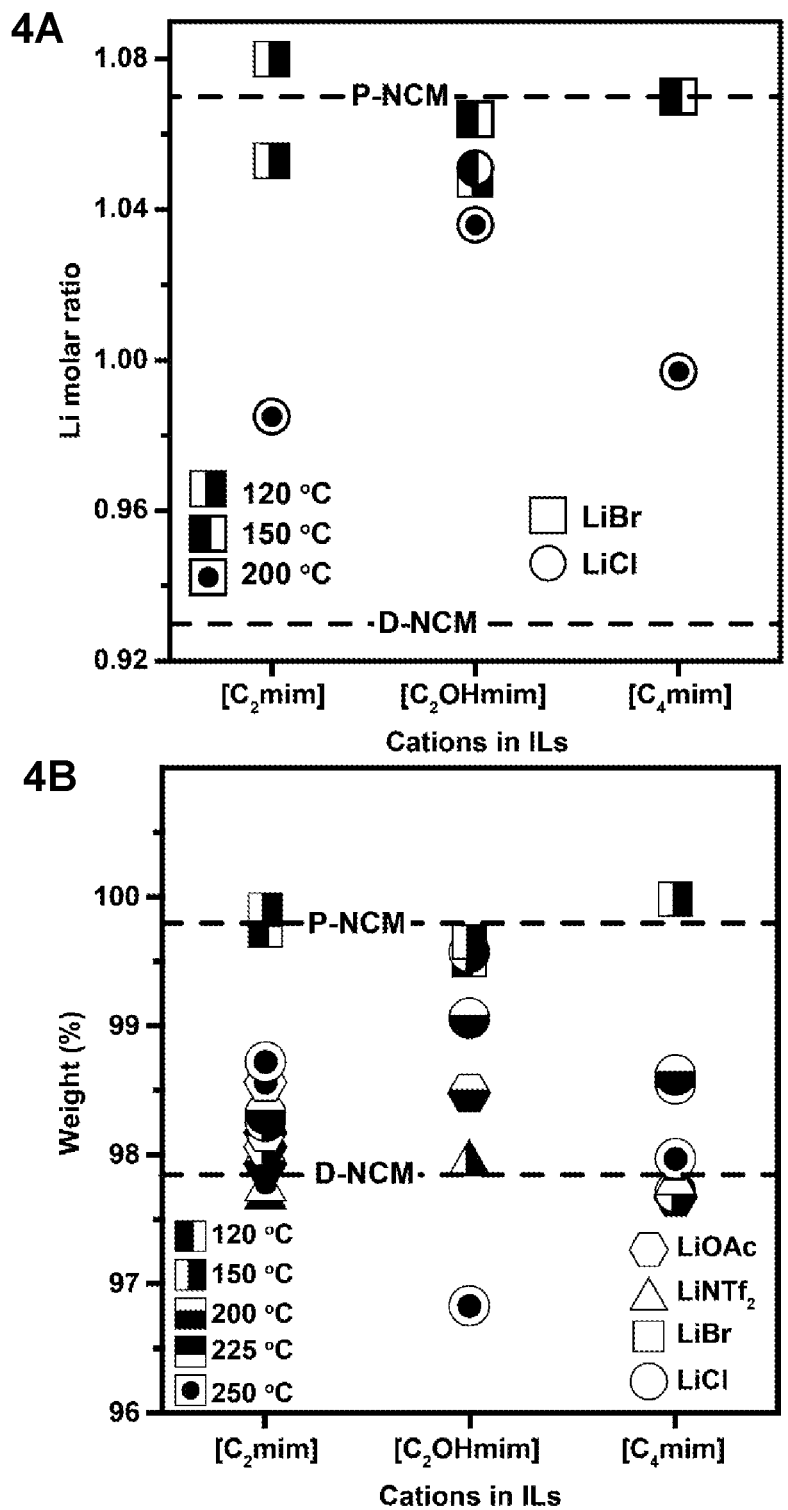
FIGS. 4A-4B.

FIG. 4A is a graph plotting Li molar ratio of R-NCMs under different relithiation conditions calculated from ICP-OES results. As shown in FIG. 4A (center black disks), R-NCM-LiCl—C$_2$OH-200 exhibited the highest Li molar ratio when using LiCl as the Li source at 200° C., which suggests the advantage of [C$_2$OHmim][NTf$_2$] as the solvent. A possible reason is that the hydrophilic hydroxide groups in C$_2$OHmim provide additional solubility for Li salts and interaction with D-NCM, which is beneficial to the relithiation reaction. The decrease in reaction temperature from 200 to 150° C. gave the product R-NCMLiCl-C$_2$OH-150 a higher Li molar ratio (FIG. 4A, left black disks). Changing the Li precursor from LiCl to LiBr increased the Li molar ratio of products (FIG. 4A, left black disk to left black square), which indicates a better relithiation performance of LiBr than that of LiCl. A further decrease in the reaction temperature to 120° C. did not achieve a better relithiation performance. The possible reason is that the temperature of 120° C. is too low to support enough reaction activity of LiBr.

FIG. 4B is a graph plotting weight percentage (%) of R-NCMs under different relithiation conditions calculated from TGA results. As shown in FIG. 4B, higher temperatures of 225 and 250° C. did not provide a full relithiation of D-NCM either. Thus, 150° C. was found to be an optimal reaction temperature for the relithiation process under the other conditions used. Other Li salts, such as LiOAc and LiNTf$_2$, were also used as Li precursors, but exhibited less impressive relithiation performance according to the TGA results (FIG. 4B, hexagons and triangles). These results may be attributed to Br$^-$ being easier to oxidize than other anions, and the oxidation product (Br$_2$) can be removed by evaporation to promote the advance of lithiation reaction. Although the oxidation product of LiCl is Cl$_2$, which can automatically vacate the reaction system, the standard oxidation potential of Cl$^-$ to Cl$_2$ is 1.358 V, which is substantially higher than that of Bf to Br$_2$ (1.065 V). Thus, LiBr has herein been found to be an optimal Li precursor for the relithiation process. When using LiBr as Li precursor at 150° C., the products using all three ILs achieved a full relithiation with Li molar ratios being almost the same as P-NCM (FIG. 4A, left black squares).

Recycling of ILs is an important step toward the economical recycling of NCM cathode. In this approach, as much as 98.7% of ILs can be collected after the relithiation process. Table 1 (below) shows these exceptional results. Moreover, as noted in Table 1, considering the high boiling point (189° C.) of dimethyl sulfoxide (DMSO), DMSO was studied as a molecular solvent in duplicate IL-free experiments with LiBr as lithium source at 150° C. for 6 hours. The results are shown in Table 1. Notably, both TGA and XRD indicated that lithium is not fully restored in these experiments, which further demonstrates the positive role of ILs in the relithiation process.

($v_a$(SNS)) in $NTf_2$. (T. Mourmene et al., *J. Mol. Struct.* 1083, 179, 2015). After the relithiation process at different temperatures (150, 200, or 250° C.), all the absorption peaks of recovered [$C_2$OHmim][$NTf_2$] are consistent with those of fresh [$C_2$OHmim][$NTf_2$], which indicates the excellent stability of functional groups in the ILs and the recyclability of the ILs for the ionothermal relithiation process. The use of recyclable solvents and cost-effective Li sources advantageously permit the economical recycling of NCM cathodes.

Tables 2 and 3 (below) provide ICP-OES and XRD results, respectively, for R-NCM under different lithiation conditions.

TABLE 1

Summary of ionothermal experiments and TGA final weight percentages of R-NCM (relithiated NCM cathode material) under different lithiation conditions

| Ionic liquid | Lithium precursor | Temp. (° C.) | NCM 111 recovered (%) | IL recovered (%) and color | TGA final (%) |
|---|---|---|---|---|---|
| [$C_2$mim][$NTf_2$] | LiCl | 250 | 79.5 | 82.9, green | 98.72 |
| | LiOAc | 250 | 89.0 | 76.9, brown | 98.56 |
| | $LiNTf_2$ | 250 | 95.5 | 94.5, colorless | 97.78 |
| | LiOAc | 225 | 81.7 | 73.0, colorless | 98.17 |
| | LiCl | 200 | 95.7 | 93.2, green | 98.32 |
| | LiOAc | 200 | 86.3 | 76.2, colorless | 97.93 |
| | $LiNTf_2$ | 200 | 96.2 | 94.0, colorless | 97.72 |
| | LiCl | 150 | 88.0 | 92.5, green | 98.26 |
| | LiOAc | 150 | 82.1 | 80.2, colorless | 98.06 |
| | LiBr | 150 | 86.5 | 80.8, green | 99.90 |
| | LiBr | 120 | 97.6 | 98.7, brown | 99.74 |
| | $Li_2CO_3$ | 150 | 95.3 | 89.6, colorless | 95.35 |
| [$C_4$mim][$NTf_2$] | LiCl | 250 | 84.2 | 89.5, green | 97.97 |
| | LiCl | 225 | 93.0 | 92.5, green | 98.55 |
| | $LiNTf_2$ | 225 | 91.2 | 94.5, colorless | 97.83 |
| | LiCl | 200 | 81.3 | 94.6, green | 98.62 |
| | LiOAc | 200 | 19.0 | 81.6, yellow | 97.67 |
| | LiCl | 150 | 94.4 | 93.2, green | 97.71 |
| | LiBr | 150 | 90.1 | 56.4, green | 99.98 |
| [$C_2$OHmim][$NTf_2$] | LiCl | 250 | 77.7 | 81.7, green | 96.83 |
| | LiCl | 200 | 82.8 | 92.7, green | 99.06 |
| | LiOAc | 200 | 84.4 | 84.8, brown | 98.48 |
| | LiCl | 150 | 83.9 | 94.8, green | 99.57 |
| | $LiNTf_2$ | 150 | 74.6 | 83.7, brown | 97.97 |
| | LiBr | 150 | 92.7 | 96.5, green | 99.65 |
| | LiBr | 120 | 95.2 | 97.4, green | 99.51 |
| DMSO | LiBr | 150 | 93.3 | 78.8, green | 96.64 |

Figure 5:
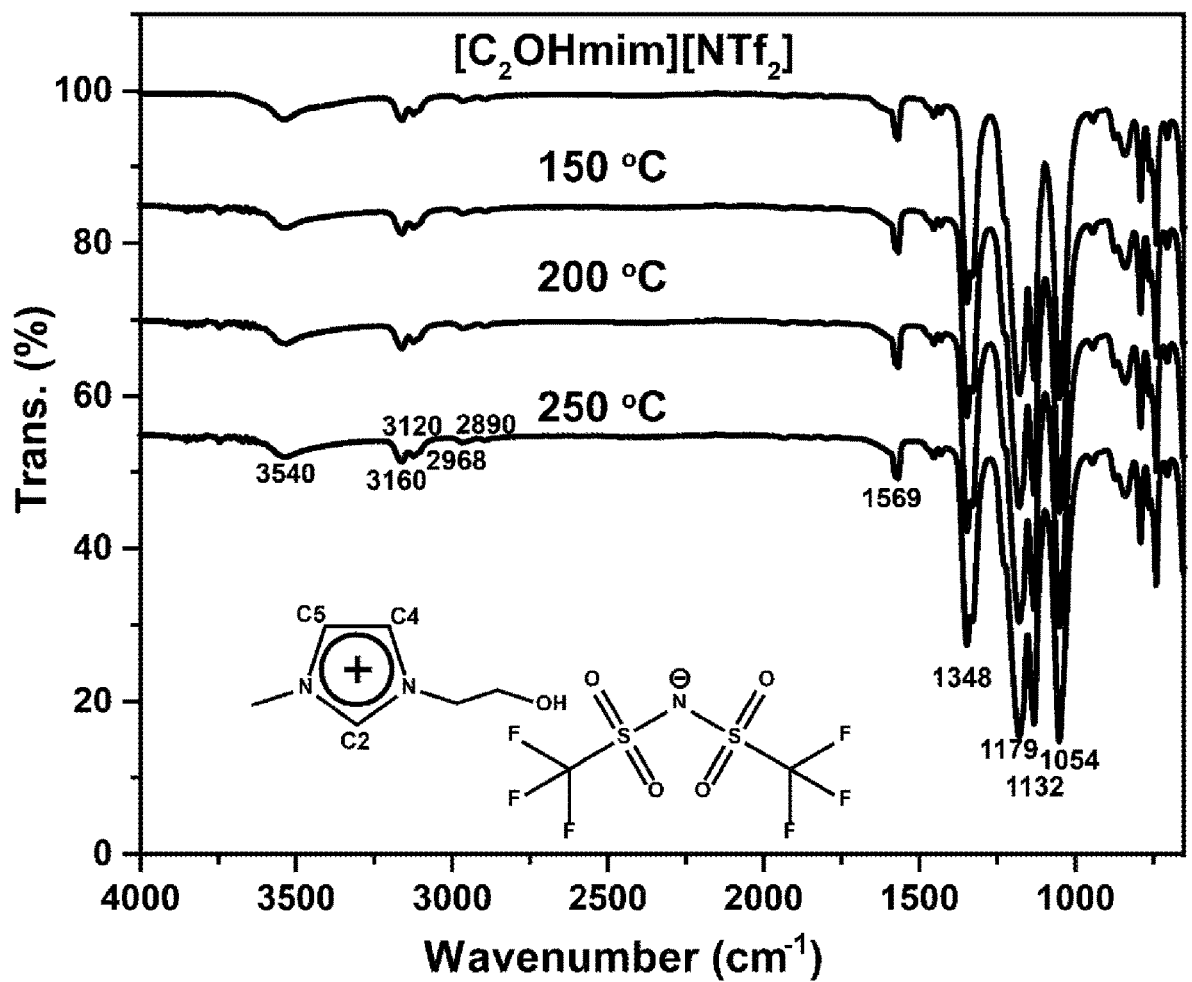
FIG. 5. FT-IR spectra for recycled [C$_2$OHmim][NTf$_2$] after relithiation processes at different temperatures.

Although the TGA results have shown an excellent thermal stability of ILs below 300° C., Fourier-transform infrared spectroscopy (FT-IR) spectroscopy was herein used to further test the stability of the functional groups in ILs during the relithiation process. As shown in FIG. 5, the FT-IR spectra of [$C_2$OHmim][$NTf_2$] exhibits stretching vibrations of v(alkyl C—H) between 2890 and 2968 $cm^{-1}$ and broad absorption peaks of v(O—H) at 3540 $cm^{-1}$, which correspond to substituents on the imidazole (Y.-Z. Zheng et al., *Spectrochim. Acta, Part A,* 226, 117641, 2020). The broad absorption peak at 3160 $cm^{-1}$ corresponds to v(C—H) at C4 and C5 sites, while the peak at 3120 $cm^{-1}$ corresponds to v(C—H) at C2 on the imidazolium ring (FIG. 5) (Y.-Z. Zheng et al., Ibid.). The absorption peak around 1569 $cm^{-1}$ is due to the in-plane imidazolium ring deformation (A ring) and scissoring $CH_2$ (H. Azizi-Toupkanloo et al., *J. Iran. Chem. Soc.,* 14, 1281, 2017). The principal absorption peaks at 1132 and 1348 $cm^{-1}$ were from the $NTf_2$ anion, attributed to the symmetric $SO_2$ stretch [$vs(SO_2)$] and asymmetric $SO_2$ stretches [$v_a(SO_2)$], respectively. The stretches of the $CF_3$ groups (v($CF_3$)) exhibited a strong absorption peak at 1179 $cm^{-1}$. The absorption peak around 1054 $cm^{-1}$ corresponds to an $NCH_3$ twist in $C_2$OHmim and SNS asymmetric stretch

TABLE 2

ICP-OES results for R-NCM under different lithiation conditions

| | Mole ratio | | | |
|---|---|---|---|---|
| Sample ID/Reaction conditions | Li | Ni | Co | Mn |
| P-NCM | 1.072 | 0.337 | 0.332 | 0.332 |
| D-NCM | 0.927 | 0.337 | 0.332 | 0.332 |
| LiCl, [$C_2$OHmim][$NTf_2$], 150° C. | 1.051 | 0.338 | 0.334 | 0.328 |
| LiCl, [$C_2$mim][$NTf_2$], 200° C. | 0.985 | 0.338 | 0.334 | 0.329 |
| LiCl, [$C_4$mim][$NTf_2$], 200° C. | 0.997 | 0.342 | 0.338 | 0.321 |
| LiCl, [$C_2$OHmim][$NTf_2$], 200° C. | 1.036 | 0.339 | 0.335 | 0.327 |
| LiBr, [$C_2$OHmim][$NTf_2$], 150° C. | 1.064 | 0.335 | 0.326 | 0.340 |
| LiBr, [$C_2$OHmim][$NTf_2$], 120° C. | 1.048 | 0.339 | 0.329 | 0.332 |
| LiBr, [$C_4$mim][$NTf_2$], 150° C. | 1.070 | 0.339 | 0.329 | 0.332 |
| LiBr, [$C_2$mim][$NTf_2$], 150° C. | 1.080 | 0.338 | 0.331 | 0.331 |
| LiBr, [$C_2$mim][$NTf_2$], 120° C. | 1.053 | 0.338 | 0.329 | 0.332 |

TABLE 3

XRD results for R-NCM under different lithiation conditions

| Ionic liquid | Lithiated reagent | Temp. (° C.) | XRD 003/104 ratio | XRD 108/110 gap |
|---|---|---|---|---|
| [C$_2$mim][NTf$_2$] | LiCl | 250 | 1.92 | 0.78 |
| | LiOAc | 250 | 2.10 | 0.72 |
| | LiNTf$_2$ | 250 | 1.63 | 0.71 |
| | LiOAc | 225 | 1.32 | 0.71 |
| | LiCl | 200 | 1.59 | 0.78 |
| | LiNTf$_2$ | 200 | 1.35 | 0.76 |
| | LiCl | 150 | 2.08 | 0.91 |
| | LiOAc | 150 | 2.04 | 0.91 |
| | LiCl | 225 | 1.65 | 0.73 |
| | LiNTf$_2$ | 225 | 1.13 | 0.75 |
| | LiCl | 150 | 2.10 | 0.91 |
| [C$_2$OHmim][NTf$_2$] | LiCl | 250 | 1.54 | 0.76 |
| | LiCl | 200 | 0.92 | 0.73 |
| | LiCl | 150 | 1.67 | 0.71 |
| | LiNTf$_2$ | 150 | 1.85 | 0.71 |
| P-NCM | As received | | 1.87 | 0.78 |
| D-NCM | As received | | 2.17 | 1.04 |

Li$_2$CO$_3$ was also used as a Li source in a control experiment. However, the unreacted Li$_2$CO$_3$ in the product was difficult to remove because of its poor solubility in acetone and ethanol. As determined by XRD, the relithiated sample using Li$_2$CO$_3$ as lithium source exhibited a series of extra peaks at 21.4°, 30.7° and 31.9°, which correspond to residual Li$_2$CO$_3$. A TGA of this sample showed a thermal stability of 95.35%, which is lower than D-NCM (97.84%). Given the foregoing results and the fact that LiBr and LiCl are less expensive than Li$_2$CO$_3$, a further advantage is evident in LiBr or LiCl over Li$_2$CO$_3$.

In conclusion, a novel ionothermal relithiation of delithiated NCM cathode was achieved by using ILs as the recyclable solvent and cost-effective lithium halide salt as a Li precursor. The fully recovered NCM structure and chemical composition were verified by XRD, TGA, and ICP characterization methods. The relithiated NCM cathode material exhibited excellent electrochemical performance as a pristine NCM cathode material in both half-cell and full-cell tests. The cycle stability of R-NCM was also demonstrated. Thus, the above described ionothermal relithiation process has been demonstrated as a cost-effective and highly practical means for the direct recycling of NCM cathodes.

While there have been shown and described what are at present considered the preferred embodiments of the invention, those skilled in the art may make various changes and modifications which remain within the scope of the invention defined by the appended claims.

What is claimed is:

1. A method for relithiating cathode material from spent lithium-based batteries, the method comprising:
   (i) mixing delithiated cathode material and a lithium salt with an ionic liquid in which the lithium salt is at least partially soluble to form an initial mixture;
   (ii) heating the initial mixture to a temperature of 100° C. to 300° C. to result in relithiation of the delithiated cathode material; and
   (iii) separating the ionic liquid from the relithiated cathode material wherein the ionic liquid is an imidazolium ionic liquid having the following formula:

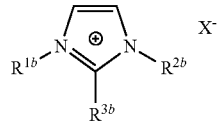

wherein:
R$^{1b}$ and R$^{2b}$ are each independently a saturated or unsaturated, straight-chained, branched, or cyclic hydrocarbon group (R) independently containing 1-12 carbon atoms and optionally and independently containing one or more heteroatoms selected from oxygen, nitrogen, sulfur, and fluorine atoms;
R$^{3b}$ is hydrogen atom (H) or a saturated or unsaturated, straight-chained, branched, or cyclic hydrocarbon group (R) independently containing 1-12 carbon atoms and optionally and independently containing one or more heteroatoms selected from oxygen, nitrogen, sulfur, and fluorine atoms;
wherein at least one of R$^{1b}$, R$^{2b}$ and R$^{3b}$ contains a hydroxy group; and
X− is an anion of the ionic liquid.

2. The method of claim 1, wherein the delithiated cathode material is a powder.

3. The method of claim 2, wherein the powder has a particle size of up to 100 microns.

4. The method of claim 1, wherein the lithium salt is a lithium halide.

5. The method of claim 4, wherein the lithium halide is lithium bromide.

6. The method of claim 1, wherein the lithium salt is a lithium carboxylate.

7. The method of claim 6, wherein the lithium carboxylate is lithium acetate or lithium oxalate.

8. The method of claim 1, wherein the initial mixture is heated to a temperature of 150° C. to 300° C.

9. The method of claim 1, wherein the initial mixture is heated to a temperature of 150° C. to 250° C.

10. The method of claim 1, wherein the cathode material is a lithium metal oxide, wherein the metal is selected from the group consisting of Ni, Co, Fe, Mn, Al, Zr, Ti, Nb, and combinations thereof.

11. The method of claim 10, wherein the metal is Ni, Co, or combination thereof.

12. The method of claim 11, wherein the cathode material has the formula LiNi$_x$Mn$_y$Co$_z$O$_2$, wherein x>0, y>0, z>0, and x+y+z=1.

13. The method of claim 12, wherein x, y, and z are each in a range of 0.2-0.5.

14. The method of claim 12, wherein x is at least 0.6.

15. The method of claim 1, wherein R$^{1b}$ and R$^{2b}$ are each independently a saturated or unsaturated, straight-chained, branched, or cyclic alkyl group containing 1-12 carbon atoms and optionally and independently containing one or more heteroatoms selected from oxygen, nitrogen, sulfur, and fluorine atoms, wherein at least one of R$^{1b}$ and R$^{2b}$ contains a hydroxy group; and R$^{3b}$ is hydrogen atom (H) or a saturated or unsaturated, straight-chained, branched, or cyclic alkyl group containing 1-12 carbon atoms and optionally and independently containing one or more heteroatoms selected from oxygen, nitrogen, sulfur, and fluorine atoms.

16. The method of claim 15, wherein R$^{1b}$ and R$^{2b}$ are each independently a saturated or unsaturated, straight-chained, branched, or cyclic alkyl group containing 1-6 carbon atoms and optionally and independently containing one or more heteroatoms selected from oxygen, nitrogen, sulfur, and fluorine atoms, wherein at least one of $R^{1b}$ and $R^{2b}$ contains a hydroxy group; and $R^{3b}$ is hydrogen atom (H) or a saturated or unsaturated, straight-chained, branched, or cyclic alkyl group containing 1-6 carbon atoms and optionally and independently containing one or more heteroatoms selected from oxygen, nitrogen, sulfur, and fluorine atoms.

17. The method of claim 1, wherein the ionic liquid is separated from the relithiated cathode material in step (iii) by centrifugation.

18. The method of claim 1, wherein, after separating the ionic liquid from the relithiated cathode material in step (iii), the ionic liquid is re-used in the method.

19. The method of claim 1, wherein the relithiated cathode material is incorporated into a cathode of a lithium-based battery.

20. The method of claim 1, wherein the relithiated cathode material is calcined at a temperature of 400-900° C.

* * * * *